United States Patent
Kang

(10) Patent No.: US 11,643,117 B2
(45) Date of Patent: May 9, 2023

(54) APPARATUS FOR DETERMINING HANDS-ON BASED ON MOTION RECOGNITION, SYSTEM INCLUDING THE SAME, AND VEHICLE CONTROL METHOD THEREOF

(71) Applicants: HYUNDAI MOTOR COMPANY, Seoul (KR); KIA MOTORS CORPORATION, Seoul (KR)

(72) Inventor: Min Chul Kang, Gyeonggi-do (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 150 days.

(21) Appl. No.: 16/904,209

(22) Filed: Jun. 17, 2020

(65) Prior Publication Data

US 2021/0171067 A1    Jun. 10, 2021

(30) Foreign Application Priority Data

Dec. 4, 2019   (KR) .................. 10-2019-0160199

(51) Int. Cl.
  *B60W 60/00*  (2020.01)
  *B60W 40/09*  (2012.01)
  *G06V 20/56*  (2022.01)
  *G06V 20/59*  (2022.01)
  *G06V 40/20*  (2022.01)

(52) U.S. Cl.
  CPC ........ *B60W 60/0059* (2020.02); *B60W 40/09* (2013.01); *G06V 20/588* (2022.01); *G06V 20/597* (2022.01); *G06V 40/28* (2022.01); *B60W 2540/223* (2020.02); *B60W 2540/225* (2020.02); *B60W 2555/20* (2020.02)

(58) Field of Classification Search
  None
  See application file for complete search history.

(56) References Cited

U.S. PATENT DOCUMENTS

| | | | |
|---|---|---|---|
| 8,260,482 B1* | 9/2012 | Szybalski | B60W 10/04 701/410 |
| 8,564,424 B2* | 10/2013 | Evarts | B60W 40/08 340/439 |
| 10,011,281 B1 | 7/2018 | Kang et al. | |
| 2008/0080741 A1* | 4/2008 | Yokoo | B60R 21/01538 382/104 |
| 2016/0357186 A1* | 12/2016 | Dias | B60W 50/10 |
| 2017/0349185 A1* | 12/2017 | McNew | B60Q 9/00 |
| 2018/0231976 A1* | 8/2018 | Singh | B60W 30/12 |

(Continued)

FOREIGN PATENT DOCUMENTS

KR    10-2018-0104938 A    9/2018

*Primary Examiner* — David P. Merlino
(74) *Attorney, Agent, or Firm* — Morgan, Lewis & Bockius LLP

(57) ABSTRACT

A hands-on determination device, a system including the same, and a vehicle control method thereof are provided. The hands-on determination device includes a processor that determines a hands-on state of a driver through motion recognition and determines whether to use a result of determination of the hands-on state based on at least one of a weather condition, a condition for validity of motion sensing, classification of a driving road, a vehicle control state, or a driver state and a storage storing data for motion recognition.

20 Claims, 6 Drawing Sheets

(56) References Cited

U.S. PATENT DOCUMENTS

| | | |
|---|---|---|
| 2018/0232636 A1* | 8/2018 | Kawaguchi ............ G06V 10/82 |
| 2019/0009793 A1* | 1/2019 | Wulf ................... B60W 50/087 |
| 2019/0016344 A1* | 1/2019 | Eh ....................... B60W 50/085 |
| 2020/0017123 A1* | 1/2020 | Aizawa .................. B62D 1/181 |
| 2020/0262441 A1* | 8/2020 | Kuwahara ............. B60W 40/08 |
| 2021/0024075 A1* | 1/2021 | Eigel ..................... B60W 40/08 |
| 2021/0097408 A1* | 4/2021 | Sicconi .............. G06K 9/00228 |
| 2021/0107527 A1* | 4/2021 | Karve ................... B60W 40/08 |
| 2021/0206334 A1* | 7/2021 | Sabournin ......... B60R 21/01532 |

* cited by examiner

<401>

<402>

=

<403>

<404>

≠

APPARATUS FOR DETERMINING HANDS-ON BASED ON MOTION RECOGNITION, SYSTEM INCLUDING THE SAME, AND VEHICLE CONTROL METHOD THEREOF

CROSS-REFERENCE TO RELATED APPLICATION

The present application claims priority to and the benefit of Korean Patent Application No. 10-2019-0160199, filed on Dec. 4, 2019, which is incorporated herein by reference in its entirety.

TECHNICAL FIELD

The present disclosure relates to an apparatus for determining hands-on based on motion recognition, a system including the same, and a method thereof, and more particularly, relates to technologies of determining a hands-on state based on motion recognition.

BACKGROUND

The statements in this section merely provide background information related to the present disclosure and may not constitute prior art.

In general, the steering wheel of the vehicle is a device for performing steering control of the vehicle as the driver directly holds and manipulates the steering wheel. Recently, with the development of autonomous driving technologies, the lane following assist (LFA) or the like for assisting the driver to drive has been developed.

Although the LFA assists the driver to perform lane keeping, the entity of steering control is the driver. Thus, when the driver does not hold the steering wheel, the LFA should warn the driver about it to guide the user to perform safety driving. To this end, it is continuously determined whether the driver holds the steering wheel. There is a representative method of making an indirect determination using a torque sensor mounted on the steering column or making a direct determination using a contact-type sensor mounted on the steering wheel.

An existing technology determines a hands-off state using such sensors and warns the driver about hands-off when the driver is in the hands-off state. Thereafter, when it is determined that the driver puts his or her hands on the steering wheel, the existing technology performs vehicle control. The vehicle control is delayed during a transition time from the hands-off state of the driver and the hands-on state of the driver.

SUMMARY

An aspect of the present disclosure provides an apparatus for determining hands-on based on motion recognition to determine that a driver puts his or her hands on the steering wheel although the driver is slightly away from the steering wheel without holding the steering wheel of a vehicle to minimize a time delay taken from a hands-off state of the steering wheel to a hands-on state of the steering wheel, a system including the same, and a method thereof.

Another aspect of the present disclosure provides an apparatus for determining hands-on based on motion recognition to determine suitability of a motion recognition situation based on weather, a motion recognition level, driving road classification, a vehicle control state, and a driver state upon hands-on determination, a system including the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a hands-on determination device may include: a processor that determines a hands-on state of a driver through motion recognition and determines whether to use the result of determining the hands-on state based on the motion recognition, based on at least one or more of a weather condition, a condition for validity of motion sensing, classification of a driving road, a vehicle control state, or a driver state and a storage storing data for the motion recognition.

In some forms of the present disclosure, the processor may determine a current state as a hands-on state, when the hands of the driver are located within a predetermined range.

In some forms of the present disclosure, the weather condition may be classified as good in weather, normal in weather, or poor in weather. The validity of the motion sensing may be classified as good in sensing time, insufficient in sensing time, good in sensing zone, or poor in sensing zone. The classification of the driving road may be classified as an urban expressway without traffic lights, a city street with traffic lights, or a special section road. The vehicle control state may be classified as a situation where a lane change is not controlled, in-lane driving on a gentle curve, a situation where a lane change is controlled, a braking and acceleration command by the driver, or in-lane driving on a sharp curve. The driver state may be classified as stable in gaze, unstable in gaze, or normal in gaze determination.

In some forms of the present disclosure, the processor may apply the result of determining hands-on recognized based on motion recognition immediately to vehicle control, when the weather condition is good or poor in weather, when the condition for the validity of the motion sensing is one of being good in sensing time, being good in sensing zone, or being insufficient in sensing time, when the driving road is an urban expressway without traffic lights or a city street with traffic lights, when the vehicle control state is a situation where a lane change is not controlled or in-lane driving on a gentle curve, when the driver state is always stable in gaze.

In some forms of the present disclosure, the processor may apply the result of determining hands-on recognized based on motion recognition within a predetermined monitoring time period to vehicle control, when the weather condition is good or normal in weather, when the condition for the validity of the motion sensing is one of being good in sensing time, being good in sensing zone, or being insufficient in sensing time, when the driving road is an urban expressway without traffic lights or a city street with traffic lights, and when the vehicle control state is a braking and acceleration command by the driver or a situation where a lane change is controlled in a state where the driver state is stable in gaze.

In some forms of the present disclosure, the processor may apply the result of determining hands-on recognized based on motion recognition within a predetermined monitoring time period to vehicle control, when the condition for the validity of the motion sensing is one of being good in sensing time, being good in sensing zone, or being insufficient in sensing time, when the driving road is an urban expressway without traffic lights or a city street with traffic lights, when the vehicle control state is one of a situation where a lane change is not controlled, in-lane driving on a gentle curve, or a situation where a lane change is controlled, and when the driver state is normal in gaze determination.

In some forms of the present disclosure, the processor may postpone determination of substituting a hands-on signal based on motion recognition, when the weather condition is good or normal in weather, when the condition for the validity of the motion sensing is one of being good in sensing time, being good in sensing zone, or being insufficient in sensing time, when the driving road is an urban expressway without traffic lights or a city street with traffic lights, when the driver state is stable in gaze or is normal in gaze determination, and when the vehicle control state is a braking and acceleration command by the driver or in-lane driving on a sharp curve.

In some forms of the present disclosure, the processor may postpone determination of substituting a hands-on signal based on motion recognition, when the weather condition is good or normal in weather, when the condition for the validity of the motion sensing is insufficient in sensing time, when the driving road is an urban expressway without traffic lights, the driver state is always stable in gaze, and when the vehicle control state is a situation where a lane change is controlled.

In some forms of the present disclosure, the processor may postpone determination of substituting a hands-on signal based on motion recognition, when the weather condition is good or normal in weather, when the condition for the validity of the motion sensing is poor in sensing zone, when the driving road is an urban expressway without traffic lights or a city street with traffic lights, when the vehicle control state is one of a situation where a lane change is not controlled, in-lane driving on a gentle curve, a situation where a lane change is controlled, a braking and acceleration command by the driver, or in-lane driving on sharp curve, and when the driver state is stable in gaze or is normal in gaze determination.

In some forms of the present disclosure, the processor may postpone determination of substituting a hands-on signal based on motion recognition, when the weather condition is good in weather, when the condition for the validity of the motion sensing is poor in sensing zone, when the driving road is an urban expressway without traffic lights, when the vehicle control state is a situation where a lane change is not controlled, and when the driver state is unstable in gaze.

In some forms of the present disclosure, the processor may postpone determination of substituting a hands-on signal based on motion recognition, when the weather condition is good or normal in weather, when the condition for the validity of the motion sensing is good in sensing time and is good in sensing zone, when the driving road is a special section road, when the vehicle control state is one of a situation where a lane change is not controlled, in-lane driving on a gentle curve, or a situation where a lane change is controlled, a braking and acceleration command by the driver, or in-lane driving on a sharp curve, and when the driver state is stable in gaze or is normal in gaze determination.

In some forms of the present disclosure, the processor may determine that it is impossible to determine to substitute a hands-on signal based on motion recognition and notifies the driver of the determined result, irrespective of the other conditions, when the weather condition is poor in weather.

In some forms of the present disclosure, the processor may determine that it is impossible to determine to substitute a hands-on signal based on motion recognition, irrespective of the other conditions, when the driver state is unstable in gaze, and postpones determination of substituting a hands-on signal based on motion recognition, although the driver state is unstable in gaze, when the weather is good, when the sensing zone is poor, when there is an urban expressway without traffic lights, and when a lane change is not controlled.

In some forms of the present disclosure, the processor may determine that it is impossible to determine to substitute a hands-on signal based on motion recognition, when the weather condition is good or normal in weather, when the condition for the validity of the motion sensing is insufficient in sensing time and is poor in sensing zone, when the driving road is a special section road, when the vehicle control state is one of a situation where a lane change is not controlled, in-lane driving on a gentle curve, a situation where a lane change is controlled, a braking and acceleration command by the driver, or in-lane driving on a sharp curve, and when the driver state is stable in gaze or is normal in gaze determination.

In some forms of the present disclosure, the processor may determine that it is impossible to determine to substitute a hands-on signal based on motion recognition, in case of at least one or more of when the weather condition is poor in weather, when the driving road is a special section road, when the vehicle control state is a braking and acceleration command by the driver or in-lane driving on a sharp curve, or when the driver state is unstable in gaze, in a state where the condition for the validity of the motion sensing is poor in sensing zone.

According to another aspect of the present disclosure, a vehicle system may include: a hands-on determination device that determines a hands-on state of a driver through motion recognition and determines whether to use the result of determining the hands-on state based on the motion recognition, based on at least one or more of a weather condition, a condition for validity of motion sensing, classification of a driving road, a vehicle control state, or a driver state and a vehicle controller that controls a vehicle based on the result determined by the hands-on determination device.

According to another aspect of the present disclosure, a vehicle control method may include: determining a hands-on state of a driver through motion recognition, determining whether to use the result of determining the hands-on state based on the motion recognition, based on at least one or more of a weather condition, a condition for validity of motion sensing, classification of a driving road, a vehicle control state, or a driver state, and controlling a vehicle based on the result determined by the hands-on determination device.

In some forms of the present disclosure, the determining of the hands-on state may include determining a current state as a hands-on state, when the hands of the driver are located within a predetermined range.

In some forms of the present disclosure, the controlling of the vehicle may include applying the result of determining hands-on recognized based on motion recognition immediately to vehicle control, when the weather condition is good or poor in weather, when the condition for the validity of the motion sensing is one of being good in sensing time, being good in sensing zone, or being insufficient in sensing time, when the driving road is an urban expressway without traffic lights or a city street with traffic lights, when the vehicle control state is a situation where a lane change is not controlled or in-lane driving on a gentle curve, when the driver state is always stable in gaze.

In some forms of the present disclosure, the controlling of the vehicle may include applying the result of determining hands-on recognized based on motion recognition within a predetermined monitoring time period to vehicle control, when the weather condition is good or normal in weather, when the condition for the validity of the motion sensing is one of being good in sensing time, being good in sensing zone, or being insufficient in sensing time, when the driving road is an urban expressway without traffic lights or a city street with traffic lights, when the vehicle control state is a braking and acceleration command by the driver or a situation where a lane change is controlled in a state where the driver state is stable in gaze.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
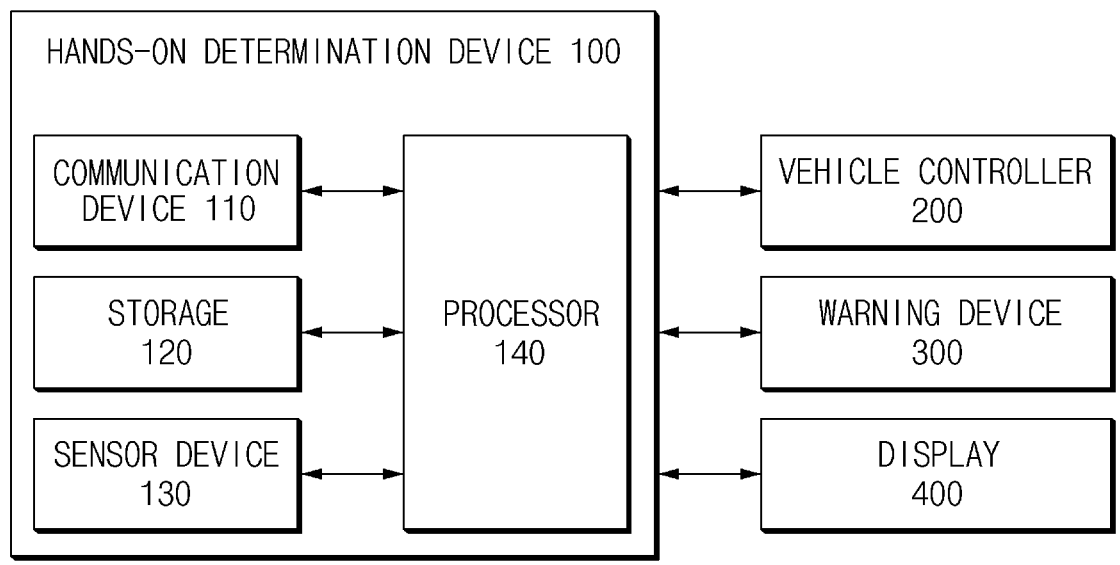
FIG. 1 is a block diagram illustrating a configuration of a vehicle system including a hands-on determination device in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing the components of some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, a description will be given in some forms of the present disclosure with reference to FIGS. 1 and 6.

FIG. 1 is a block diagram illustrating a configuration of a vehicle system including a hands-on determination device in some forms of the present disclosure.

Referring to FIG. 1, the vehicle system in some forms of the present disclosure may include a hands-on determination device 100, a vehicle controller 200, a warning device 300, and a display 400.

The hands-on determination device 100 in some forms of the present disclosure may be implemented in a vehicle. In this case, the hands-on determination device 100 may be integrally formed with control units in the vehicle, or may be implemented as a separate device to be connected with the control units of the vehicle by a separate connection means.

The hands-on determination device 100 may determine a hands-on state of a driver through motion recognition. When the hands of the driver are located within a predetermined range from the steering wheel, the hands-on determination device 100 may determine a current state as the hands-on state. Furthermore, the hands-on determination device 100 may determine suitability for the result of determining the hands-on based on the motion recognition, based on at least one or more of a weather condition, a condition for validity of motion sensing, classification of a driving road, a vehicle control state, or a driver state to determine whether to use the result of determining the hands-on based on the motion recognition rather than a result of determining hands-on by a sensor.

The hands-on determination device 100 may include a communication device 110, a storage 120, a sensor device 130, and a processor 140.

The communication device 110 may be a hardware device implemented with various electronic circuits to transmit and receive a signal through a wireless or wired connection. In some forms of the present disclosure, the communication device 110 may perform network communication technology in the vehicle and may perform vehicle-to-infrastructure (V2I) communication with a server, an infrastructure, or another vehicle outside the vehicle using wireless internet technology or short range communication. Herein, the network communication technology in the vehicle may be to perform inter-vehicle communication through controller area network (CAN) communication, local interconnect network (LIN) communication, flex-ray communication, or the like. Furthermore, the wireless internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

As an example, the communication device 110 may receive weather information, driving road information, or the like from an external server and may receive vehicle control state information, driver's gaze information, motion recognition level information, and the like from devices in the vehicle.

The storage 120 may store a sensing result of the sensor device 130, weather information or driving road information received from the outside, and data and/or algorithms necessary for an operation of the processor 140. As an example, the storage 120 may store data for motion recognition. Thus, the processor 140 may compare and analyze a captured image with data for motion recognition to determine that the hands of the driver are on or off the steering wheel.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The sensor device 130 may include one or more sensors for detecting a hands-off state of the driver. As an example, the sensor device 130 may include a torque sensor mounted on a steering column, a contact-type sensor mounted on a steering wheel, or a motion sensor. In this case, the motion sensor may include a camera, a gyro sensor, a strain gauge, or the like. The processor 140 may set a predetermined distance from the steering wheel as a motion recognition range.

The processor 140 may be electrically connected with the communication device 110, the storage 120, the sensor device 130, or the like and may electrically control the respective components. The processor 140 may be an electrical circuit which executes instructions of software and may perform a variety of data processing and calculation described below.

The processor 140 may process a signal delivered between respective components of the hands-on determination device 100. The processor 140 may be, for example, an electronic control unit (ECU), a micro controller unit (MCU), or another sub-controller, which is loaded into the vehicle.

The processor 140 may determine whether the hands of the driver are present within a predetermined range from the steering wheel, through motion recognition. When the hands of the driver are present within the predetermined range although the hands of the driver are not touched on the steering wheel, the processor 140 may determine a current state as a hands-on state.

The processor 140 may determine suitability for the result of determining hands-on based on motion recognition, based on at least one or more of a weather condition, a condition for validity of motion sensing, classification of a driving road, a vehicle control state, or a driver state to determine whether to use the result of determining the hands-on based on the motion recognition for vehicle control.

The weather condition may be classified as good, normal, or poor in weather. The condition for the validity of the motion sensing may be classified as good in sensing time, insufficient in sensing time, good in sensing zone, or poor in sensing zone. The classification of the driving road may be classified as an urban expressway without traffic signals, a city street with traffic lights, or a special section road. The vehicle control state may be classified as a situation where a lane change is not controlled, in-lane driving on a gentle curve, a situation where a lane change is controlled, a braking and acceleration command by a driver, or in-lane driving on a sharp curve. The driver state may be classified as stable in gaze, unstable in gaze, or normal in gaze determination.

The processor 140 may determine to use a hands-on signal determined by motion recognition immediately, use a hands-on signal determined by motion recognition within a monitoring time, postpone determination of substituting a hands-on signal based on motion recognition (request the driver to input a signal again), or be impossible to determine to substitute a hands-on signal based on motion recognition (notify the driver of an impossible situation), based on at least one or more of a weather condition, a condition for validity of motion sensing, classification of a driving road, a vehicle control state, or a driver state.

When the weather condition is good or poor in weather, when the condition for the validity of the motion sensing is one of being good in sensing time, being good in sensing zone, or being insufficient in sensing time, when the driving road is an urban expressway without traffic lights or a city street with traffic lights, when the vehicle control state is a situation where a lane change is not controlled or in-lane driving on a gentle curve, when the driver state is always stable in gaze, the processor 140 may apply the result of determining hands-on recognized based on motion recognition immediately to vehicle control.

When the weather condition is good or normal in weather, when the condition for the validity of the motion sensing is one of being good in sensing time, being good in sensing zone, or being insufficient in sensing time, when the driving road is an urban expressway without traffic lights or a city street with traffic lights, when the vehicle control state is a braking and acceleration command by the driver or a situation where a lane change is controlled in a state where the driver state is stable in gaze, the processor 140 may apply the result of determining hands-on recognized based on motion recognition within a predetermined monitoring time period to vehicle control.

When the condition for the validity of the motion sensing is one of being good in sensing time, being good in sensing zone, or being insufficient in sensing time, when the driving road is an urban expressway without traffic lights or a city street with traffic lights, when the vehicle control state is one of a situation where a lane change is not controlled, in-lane driving on a gentle curve, or a situation where a lane change is controlled, and when the driver state is normal in gaze determination, the processor 140 may apply the result of determining hands-on recognized based on motion recognition within the predetermined monitoring time period to vehicle control.

When the weather condition is good or normal in weather, when the condition for the validity of the motion sensing is one of being good in sensing time, being good in sensing zone, or being insufficient in sensing time, when the driving road is an urban expressway without traffic lights or a city street with traffic lights, the driver state is stable in gaze or is normal in gaze determination, and when the vehicle control state is a braking and acceleration command by the driver or in-lane driving on a sharp curve, the processor 140 may postpone determination of substituting a hands-on signal based on motion recognition.

When the weather condition is good or normal in weather, when the condition for the validity of the motion sensing is insufficient in sensing time, when the driving road is an urban expressway without traffic lights, the driver state is always stable in gaze, and when the vehicle control state is a situation where a lane change is controlled, the processor 140 may postpone determination of substituting a hands-on signal based on motion recognition.

When the weather condition is good or normal in weather, when the condition for the validity of the motion sensing is insufficient in sensing zone, when the driving road is an urban expressway without traffic lights or a city street with traffic lights, when the vehicle control state is one of a situation where a lane change is not controlled, an in-lane driving on a gentle curve, a situation where a lane change is controlled, a braking and acceleration command by the driver, or an in-lane driving on a sharp curve, and when the driver state is stable in gaze or is normal in gaze determination, the processor 140 may postpone determination of substituting a hands-on signal based on motion recognition.

When the weather condition is good in weather, when the condition for the validity of the motion sensing is poor in sensing zone, when the driving road is an urban expressway without traffic lights, when the vehicle control state is a situation where a lane change is not controlled, and when the driver state is unstable in gaze, the processor 140 may postpone determination of substituting a hands-on signal based on motion recognition.

When the weather condition is good or normal in weather, when the condition for the validity of the motion sensing is good in sensing time and is good in sensing zone, when the driving road is a special section road, when the vehicle control state is one of a situation where a lane change is not controlled, in-lane driving on a gentle curve, or a situation where a lane change is controlled, a braking and acceleration command by the driver, or in-lane driving on a sharp curve, and when the driver state is stable in gaze or is normal in gaze determination, the processor 140 may postpone determination of substituting a hands-on signal based on motion recognition.

When the weather condition is poor, irrespective of the other conditions, the processor 140 may determine that it is impossible to determine to substitute a hands-on signal based on motion recognition and may notify the driver of the determined result.

When the driver state is unstable in gaze, irrespective of the other conditions, the processor 140 may determine that it is impossible to determine to substitute a hands-on signal based on motion recognition. Although the driver state is unstable in gaze, when the weather is good, when the sensing zone is poor, when there is an urban expressway without traffic lights, and when a lane change is not controlled, the processor 140 may postpone determination of substituting a hands-on signal based on motion recognition.

When the weather condition is good or normal in weather, when the condition for the validity of the motion sensing is insufficient in sensing time and is poor in sensing zone, when the driving road is a special section road, when the vehicle control state is one of a situation where a lane change is not controlled, in-lane driving on a gentle curve, a situation where a lane change is controlled, a braking and acceleration command by the driver, or in-lane driving on a sharp curve, and when the driver state is stable in gaze or is normal in gaze determination, the processor 140 may determine that it is impossible to determine to substitute a hands-on signal based on motion recognition.

In a state where the condition for the validity of the motion sensing is poor in sensing zone, in case of at least one or more of when the weather condition is poor in weather, when the driving road is a special section road, when the vehicle control state is a braking and acceleration command by the driver or in-lane driving on a sharp curve, or when the driver state is unstable in gaze, the processor 140 may determine that it is impossible to determine to substitute a hands-on signal based on motion recognition.

The vehicle controller 200 may receive the result of determining hands-on from the hands-on determination device 100 and may perform autonomous driving control of the vehicle.

The warning device 300 may provide a warning for guiding the user to put his or her hands on the steering wheel when the hands of the user are off the steering wheel. In this case, the warning may be provided in various methods such as a visual warning, an audible warning, and a tactile warning.

The display 400 may include an input means for receiving a control command from the user and an output means for outputting an operational state, an operation result, or the like of the hands-on determination device 100. Herein, the input means may include a key button and may further include a mouse, a joystick, a jog shuttle, a stylus pen, or the like. Furthermore, the input means may further include a soft key implemented on a display. The output means may include the display and may further include a voice output means such as a speaker. In this case, a touch sensor such as a touch film, a touch sheet, or a touch pad is provided in the display, the display operates as a touchscreen and may be implemented in a form where the input means and the output means are integrated with each other. In some forms of the present disclosure, the output means may output a sentence for warning the user about hands-off.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

Some forms of the present disclosure may solve inconvenience according to a time delay in a state transition process from a hands-off condition to a hands-on condition and may enhance the problem where the driver should always hold the steering wheel directly. Furthermore, some forms of the present disclosure may increase continuity at a threshold time when the steering column is unlocked while the vehicle is traveling in an advanced driver assistance systems (ADAS)/autonomous driving mode.

Figure 2:
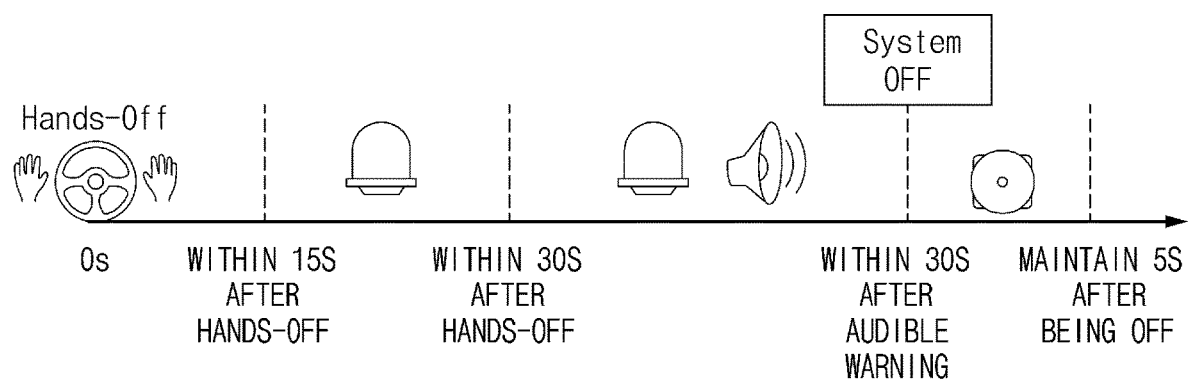
FIG. 2 is a drawing illustrating a warning process upon hands-off in one form of the present disclosure.
Figure 3:
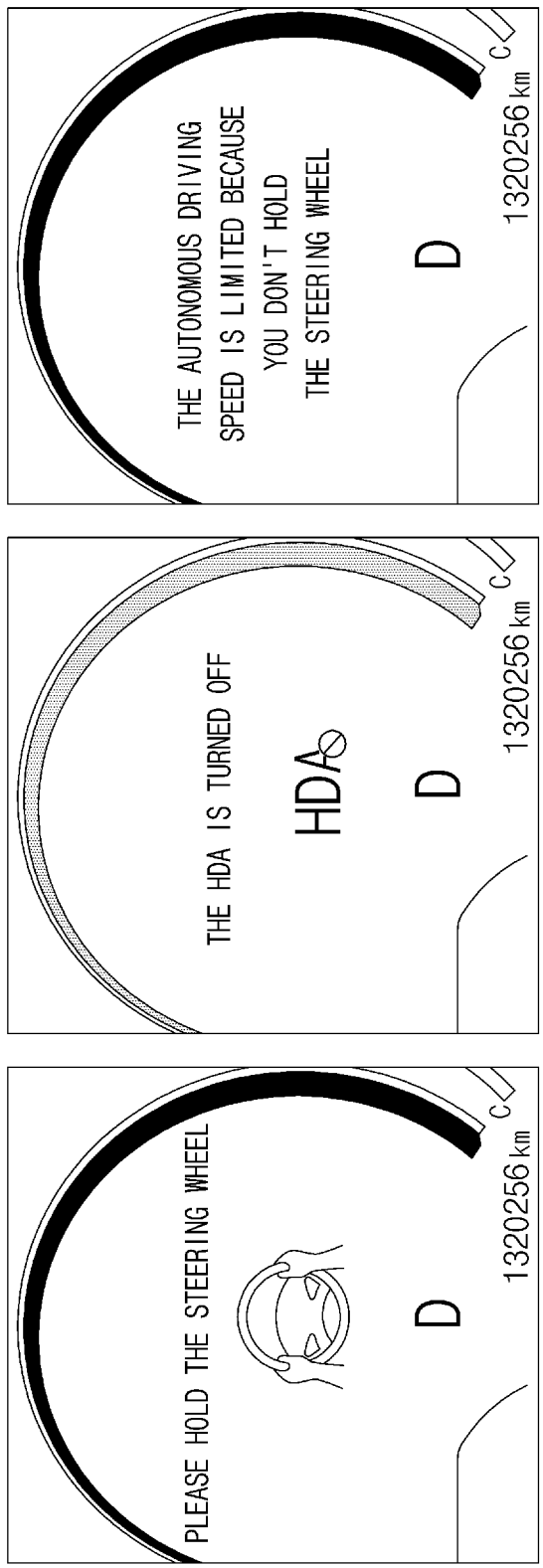
FIG. 3 is a drawing illustrating an exemplary screen displayed on a display upon hands-on determination in one form of the present disclosure.

FIG. 2 is a drawing illustrating a warning process upon hands-off in some forms of the present disclosure. FIG. 3 is a drawing illustrating an exemplary screen displayed on a display upon hands-on determination in some forms of the present disclosure. Referring to FIG. 2, when 15 seconds elapses in a hands-off state during autonomous driving, a hands-on determination device 100 of FIG. 1 may primarily output a visual warning to a driver. For example, like reference numeral 301 of FIG. 3, the hands-on determination device 100 may output words of guidance for guiding the driver to put his or her hands on the steering wheel.

Thereafter, when 30 seconds elapses after hands-off, the hands-on determination device 100 may output a visual warning and an audible warning together. When continuously in the hands-off state, the hands-on determination device 100 may turn off an autonomous driving system. Like reference numeral 302 of FIG. 3, the hands-on determination device 100 may notify the driver that the highway driving assist (HDA) which is one of autonomous driving functions is turned off. Like reference numeral 303, the hands-on determination device 100 may notify the driver that the autonomous driving speed is limited.

Figure 4:
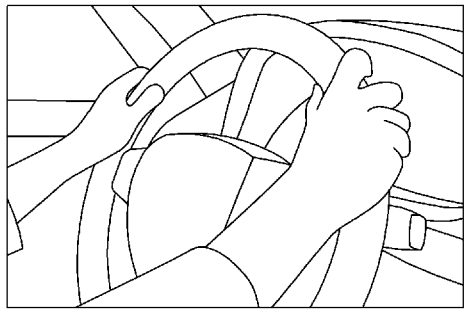
FIG. 4 is a drawing illustrating an exemplary screen for determining hands-off based on motion recognition in one form of the present disclosure.
Figure 4:
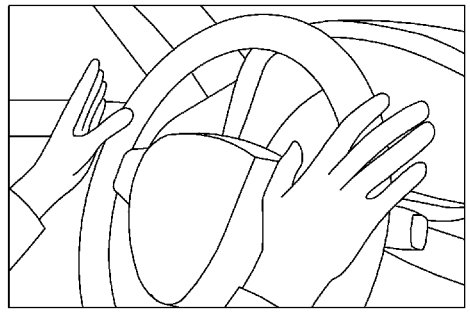
Figure 4:
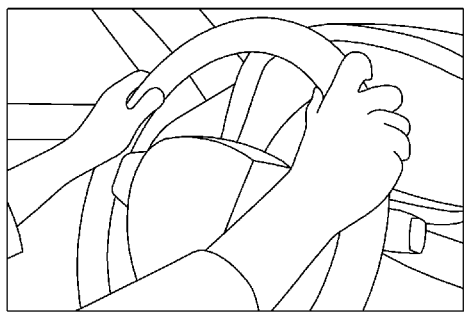
Figure 4:
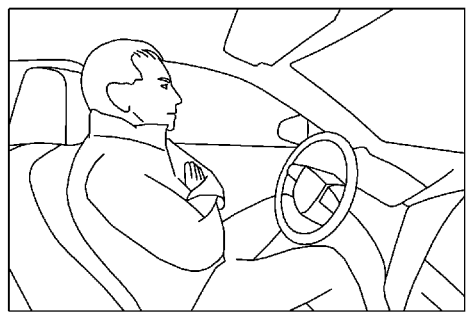

FIG. 4 is a drawing illustrating an exemplary screen for determining hands-off based on motion recognition in some forms of the present disclosure.

Referring to FIG. 4, a hands-on determination device 100 of FIG. 1 may recognize motion of a driver to determine that the driver is in a hands-on state when the driver holds the steering wheel like reference numeral 401 or when the driver is slightly away from the steering wheel although the he or she does not touch the steering wheel like reference numeral 402.

However, when the driver is far away from the steering wheel, for example, folds his or her arms like reference numeral 404, the hands-on determination device 100 may determine that the driver is in hands-off state.

As such, the hands-on determination device 100 may determine a hands-off state through motion recognition to determine a hands-on state in a wider range than that when the hands-on state is determined by a sensor or the like, thus minimizing a delay time caused when changed from the hands-off state to the hands-on state.

As such, when the hands of the driver are located within a predetermined range from the steering wheel although he or she does not touch the steering wheel, some forms of the present disclosure may recognize a current state as a state (the hands-on state) where he or she touches the steering wheel to shorten an unnecessary transition time from the hands-off state to the hands-on state, thus increasing convenience of the driver because the driver does not always hold the steering wheel.

Furthermore, some forms of the present disclosure may enhance continuity at a threshold time when the steering column is unlocked while the vehicle is traveling in an ADAS/autonomous driving mode, thus enhancing stability.

Furthermore, some forms of the present disclosure may accurately identify a trick hands-on state based on motion recognition (e.g., as if the hands of the driver are spuriously on the steering wheel using a PET bottle or the like), thus reducing a dangerous situation due to trick hands-on.

Figure 5:
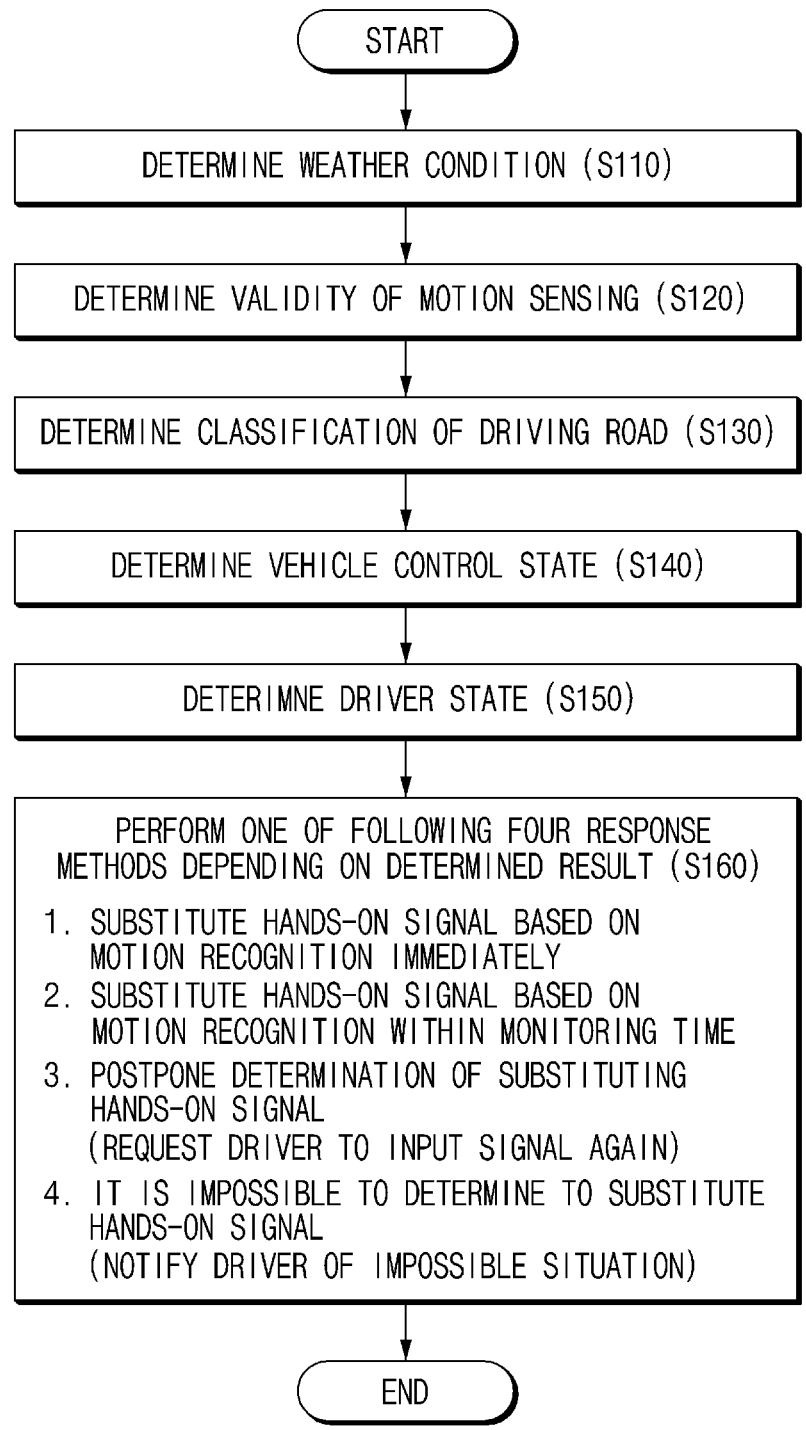
FIG. 5 is a flowchart illustrating a hands-on determination method in one form of the present disclosure.

Hereinafter, a description will be given in detail of a hands-on determination method in some forms of the present disclosure with reference to FIG. 5. FIG. 5 is a flowchart illustrating a hands-on determination method in some forms of the present disclosure.

Hereinafter, it is assumed that a hands-on determination device 100 of FIG. 1 performs a process of FIG. 5. Furthermore, in a description of FIG. 5, an operation described as being performed by an apparatus may be understood as being controlled by a processor 140 of the hands-on determination device 100.

Referring to FIG. 5, in S110, the apparatus may determine a weather condition. In this case, the weather condition may include being good in weather, being normal in weather, or being poor in weather.

In S120, the apparatus may determine the validity of motion sensing (a motion recognition level). The validity of motion sensing may be classified as good in sensing time, insufficient in sensing time, good in sensing zone, or poor in sensing zone.

In S130, the apparatus may determine classification of a driving road. The classification of the driving road may be classified as an urban expressway without traffic lights, a city street with traffic lights, or a special section road.

In S140, the apparatus may determine a vehicle control state. The vehicle control state may be classified as a situation where a lane change is not controlled, in-lane driving on a gentle curve, a situation where a lane change is controlled, a braking and acceleration command by the driver, or in-lane driving on a sharp curve.

In S150, the apparatus may determine a driver state. In this case, the driver state may refer to driver gaze information. Thus, the driver state may be classified as stable in gaze, unstable in gaze, or normal in gaze determination.

In S160, the apparatus may perform the following response methods using the weather condition, the validity of motion sensing, the classification of the driving road, the vehicle stable state, the driver state, and the like.

Substituting a hands-on signal based on motion recognition immediately

Substituting a hands-on signal based on motion recognition within a monitoring time Postponing determination of substituting a hands-on signal (requesting the driver to input a signal again)

It is impossible to determine to substitute a hands-on signal (Notify the driver of an impossible situation)

Substituting the hands-on signal based on the motion recognition immediately may refer to determining hands-on based on motion recognition immediately and substituting the hands-on signal based on the motion recognition immediately for a hands-on signal determined by a sensor. Substituting the hands-on signal based on the motion recognition within the monitoring time may refer to substituting the hands-on signal determined based on the motion recognition within the monitoring time for a hands-on signal detected by the sensor.

Postponing the determination of substituting the hands-on signal may refer to postponing determination for substituting a hands-on signal based on motion recognition. It is impossible to determine to substitute the hands-on signal may mean that determination for substituting a hands-on signal based on motion recognition is impossible.

For example, for a lane change assist system, a user should put his or her hands on the steering wheel, within a predetermined time (e.g., 2 seconds) after a turn signal is activated. However, when the user does not put his or her hands on the steering wheel, the lane change assist system is turned off or the lane change assist system requests the driver again to put his or her hands on the steering wheel. Thus, as vehicle control is not performed upon an urgent situation and as the driver is only required to put his or her hands on the steering wheel, vehicle control gaps occur until the driver is in a hands-on state from a hands-off state after the driver is requested to put his or her hands on the steering wheel. Thus, this results in a dangerous situation.

Thus, some forms of the present disclosure may recognize a hands-on state in a wider range based on motion recognition, thus minimizing vehicle control gaps due to a hands-off state.

The hands-on determination device 100 may be applied to a lane change assist system, a lane keeping assist system (LKAS), a highway driving pilot (HDP), or the like.

Hereinafter, a description will be given in detail of an example of substituting a hands-on signal based on motion recognition with reference to Tables 1 to 15 below.

TABLE 1

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Good in sensing time | Urban expressway without traffic lights | Situation where lane change is not controlled | Stable in gaze | Substitute hands-on signal based on motion recognition immediately (50 ms) |
| Good in weather | Good in sensing time | Urban expressway without traffic lights | In-lane driving on gentle curve | Stable in gaze | Substitute hands-on signal based on motion recognition immediately (50 ms) |
| Good in weather | Insufficient in sensing time | City street with traffic lights | In-lane driving on gentle curve | Stable in gaze | Substitute hands-on signal based on motion recognition immediately (50 ms) |
| Good in weather | Insufficient in sensing time | City street with traffic lights | Situation where lane change is not controlled | Stable in gaze | Substitute hands-on signal based on motion recognition immediately (50 ms) |
| Good in weather | Good in sensing zone | Urban expressway without traffic lights | In-lane driving on gentle curve | Stable in gaze | Substitute hands-on signal based on motion recognition immediately (50 ms) |
| Good in weather | Good in sensing zone | City street with traffic lights | Situation where lane change is not controlled | Stable in gaze | Substitute hands-on signal based on motion recognition immediately (50 ms) |
| Good in weather | Good in sensing zone | City street with traffic lights | In-lane driving on gentle curve | Stable in gaze | Substitute hands-on signal based on motion recognition immediately (50 ms) |
| Normal in weather | Good in sensing time | Urban expressway without traffic lights | Situation where lane change is not controlled | Stable in gaze | Substitute hands-on signal based on motion recognition immediately (50 ms) |
| Normal in weather | Good in sensing time | Urban expressway without traffic lights | In-lane driving on gentle curve | Stable in gaze | Substitute hands-on signal based on motion recognition immediately (50 ms) |
| Normal in weather | Insufficiency in sensing time | City street with traffic lights | In-lane driving on gentle curve | Stable in gaze | Substitute hands-on signal based on motion recognition immediately (50 ms) |
| Normal in weather | Insufficiency in sensing time | City street with traffic lights | Situation where lane change is not controlled | Stable in gaze | Substitute hands-on signal based on motion recognition immediately (50 ms) |
| Normal in weather | Good in sensing zone | Urban expressway without traffic lights | In-lane driving on gentle curve | Stable in gaze | Substitute hands-on signal based on motion recognition immediately (50 ms) |
| Normal in weather | Good in sensing zone | City street with traffic lights | Situation where lane change is not controlled | Stable in gaze | Substitute hands-on signal based on motion recognition immediately (50 ms) |
| Normal in weather | Good in sensing zone | City street with traffic lights | In-lane driving on gentle curve | Stable in gaze | Substitute hands-on signal based on motion recognition immediately (50 ms) |

In Table 1 above, an form is exemplified as a hands-on signal is substituted based on motion recognition immediately (e.g., within 50 ms).

In other words, when the weather condition is good or poor in weather, when the condition for the validity of the motion sensing is one of being good in sensing time, being good in sensing zone, or being insufficient in sensing time, when the driving road is an urban expressway without traffic lights or a city street with traffic lights, when the vehicle control state is a situation where a lane change is not controlled or in-lane driving on a gentle curve, when the driver state is always stable in gaze, the hands-on determination device 100 may apply the result (the hands-on signal) of determining hands-on recognized based on motion recognition immediately to vehicle control.

In Tables 2 and 3 below, an form is exemplified as a hands-on signal is substituted based on motion recognition during a monitoring time (e.g., within 2000 ms).

TABLE 2

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Good in sensing d time | Urban expressway without traffic lights | Situation where lane change is controlled | Stable in gaze | Substitute hands-on signal signal based on motion recognition within monitoring time (2000 ms) |
| Good in weather | Good in sensing time | Urban expressway without traffic lights | Situation where lane change is controlled | Normal in gaze determination | Substitute hands-on signal based on motion recognition within monitoring time (2000 ms) |
| Good in weather | Good in sensing time | Urban expressway without traffic lights | Situation where lane change is not controlled | Normal in gaze determination | Substitute hands-on signal based on motion recognition within monitoring time (2000 ms) |
| Good in weather | Good in sensing time | Urban expressway without traffic lights | In-lane driving on gentle curve | Normal in gaze determination | Substitute hands-on signal based on motion recognition within monitoring time (2000 ms) |
| Good in weather | Good in sensing time | City street with traffic lights | Command to brake and accelerate by driver | Stable in gaze | Substitute hands-on signal based on motion recognition within monitoring time (2000 ms) |
| Good in weather | Good in sensing time | City street with traffic lights | Situation where lane change is controlled | Normal in gaze determination | Substitute hands-on signal based on motion recognition within monitoring time (2000 ms) |
| Good in weather | Good in sensing time | City street with traffic lights | Situation where lane change is controlled | Stable in gaze | Substitute hands-on signal based on motion recognition within monitoring time (2000 ms) |
| Good in weather | Good in sensing time | Urban expressway without traffic lights | Braking and acceleration command by driver | Stable in gaze | Substitute hands-on signal based on motion recognition within monitoring time (2000 ms) |
| Good in weather | Insufficient in sensing time | City street with traffic lights | In-lane driving on gentle curve | Normal in gaze determination | Substitute hands-on signal based on motion recognition within monitoring time (2000 ms) |

TABLE 2-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Insufficiency in sensing time | Urban expressway without traffic lights | Situation where lane change is controlled | Normal in gaze determination | Substituting hands-on signal based on motion recognition within monitoring time (2000 ms) |
| Good in weather | Insufficiency in sensing time | City street with traffic lights | Situation where lane change is not controlled | Normal in gaze determination | Substitute hands-on signal based on motion recognition within monitoring time (2000 ms) |
| Good in weather | Good in sensing zone | Urban expressway without traffic lights | In-lane driving on gentle curve | Normal in gaze determination | Substitute hands-on signal based on motion recognition within monitoring time (2000 ms) |
| Good in weather | Good in sensing zone | Urban expressway without traffic lights | Braking and acceleration command by driver | Stable in gaze | Substitute hands-on signal based on motion recognition within monitoring time (2000 ms) |
| Good in weather | Good in sensing zone | City street with traffic lights | Situation where lane change is controlled | Stable in gaze | Substitute hands-on signal based on motion recognition within monitoring time (2000 ms) |
| Good in weather | Good in sensing zone | City street with traffic lights | Situation where lane change is controlled | Normal in gaze determination | Substitute hands-on signal based on motion recognition within monitoring time (2000 ms) |
| Good in weather | Good in sensing zone | City street with traffic lights | Situation where lane change is not controlled | Normal in gaze determination | Substitute hands-on signal based on motion recognition within monitoring time (2000 ms) |
| Good in weather | Good in sensing zone | City street with traffic lights | In-lane driving on gentle curve | Normal in gaze determination | Substitute hands-on signal based on motion recognition within monitoring time (2000 ms) |

TABLE 3

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Normal in weather | Good in sensing time | Urban expressway without traffic lights | Situation where lane change is controlled | Stable in gaze | Substitute hands-on signal based on motion recognition within monitoring time (2000 ms) |
| Normal in weather | Good in sensing time | Urban expressway without traffic lights | Situation where lane change is controlled | Normal in gaze determination | Substitute hands-on signal based on motion recognition within monitoring time (2000 ms) |
| Normal in weather | Good in sensing time | Urban expressway without traffic lights | Situation where lane change is not controlled | Normal in gaze determination | Substitute hands-on signal based on motion recognition within monitoring time (2000 ms) |
| Normal in weather | Good in sensing time | Urban expressway without traffic lights | In-lane driving on gentle curve | Normal in gaze determination | Substitute hands-on signal based on motion recognition within monitoring time (2000 ms) |
| Normal in weather | Good in sensing time | City street with traffic lights | Braking and acceleration command by driver | Stable in gaze | Substitute hands-on signal based on motion recognition within monitoring time (2000 ms) |
| Normal in weather | Good in sensing time | City street with traffic lights | Situation where lane change is controlled | Normal in gaze determination | Substitute hands-on signal based on motion recognition within monitoring time (2000 ms) |
| Normal in weather | Good in sensing time | City street with traffic lights | Situation where lane change is controlled | Stable in gaze | Substitute hands-on signal based on motion recognition within monitoring time (2000 ms) |
| Normal in weather | Good in sensing time | Urban expressway without traffic lights | Braking and acceleration command by driver | Stable in gaze | Substitute hands-on signal based on motion recognition within monitoring time (2000 ms) |
| Normal in weather | Sufficient in sensing time | City street with traffic lights | In-lane driving on gentle curve | Normal in gaze determination | Substitute hands-on signal based on motion recognition within monitoring time (2000 ms) |

TABLE 3-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Normal in weather | Insufficient in sensing time | Urban expressway without traffic lights | Situation where lane change is controlled | Normal in gaze determination | Substitute hands-on signal based on motion recognition within monitoring time (2000 ms) |
| Normal in weather | Insufficiency in sensing time | City street with traffic lights | Situation where lane change is not controlled | Normal in gaze determination | Substitute hands-on signal based on motion recognition within monitoring time (2000 ms) |
| Normal in weather | Good in sensing zone | Urban expressway without traffic lights | In-lane driving on gentle curve | Normal in gaze determination | Substitute hands-on signal based on motion recognition within monitoring time (2000 ms) |
| Normal in weather | Good in sensing zone | Urban expressway without traffic lights | Braking and acceleration command by driver | Stable in gaze | Substitute hands-on signal based on motion recognition within monitoring time (2000 ms) |
| Normal in weather | Good in sensing zone | City street with traffic lights | Situation where lane change is controlled | Stable in gaze | Substitute hands-on signal based on motion recognition within monitoring time (2000 ms) |
| Normal in weather | Good in sensing zone | City street with traffic lights | Situation where lane change is controlled | Normal in gaze determination | Substitute hands-on signal based on motion recognition within monitoring time (2000 ms) |
| Normal in weather | Good in sensing zone | City street with traffic lights | Situation where lane change is not controlled | Normal in gaze determination | Substitute hands-on signal based on motion recognition within monitoring time (2000 ms) |
| Normal in weather | Good in sensing zone | City street with traffic lights | In-lane driving on gentle curve | Normal in gaze determination | Substitute hands-on signal based on motion recognition within monitoring time (2000 ms) |

In Table 2 above, when the weather condition is good in weather, when the condition for the validity of the motion sensing is one of being good in sensing time, being good in sensing zone, or being insufficient in sensing time, when the driving road is an urban expressway without traffic lights or a city street with traffic lights, and when the vehicle control state is a braking and acceleration command by the driver or a situation where a lane change is controlled in a state where the driver state is stable in gaze, the hands-on determination device 100 may apply the result (the hands-on signal) of determining hands-on recognized based on motion recognition within a predetermined monitoring time period to vehicle control.

Furthermore, when the weather condition is good in weather, when the condition for the validity of the motion sensing is one of being good in sensing time, being good in sensing zone, or being insufficient in sensing time, when the driving road is an urban expressway without traffic lights or a city street with traffic lights, and when the vehicle control state is one of a situation where a lane change is not controlled, in-lane driving on a gentle curve, or a situation where a lane change is controlled, and when the driver state is normal in gaze determination, the hands-on determination device 100 may apply the result (the hands-on signal) of determining hands-on recognized based on motion recognition within the predetermined monitoring time period to vehicle control. Table 3 is the same as Table 2 above in the other conditions except that the weather is normal in weather.

In Tables 4 to 9 below, an form is exemplified as determination of substituting a hands-on signal based on motion recognition is postponed (the driver is requested to input a signal again).

TABLE 4

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Good in sensing time | City street with traffic lights | In-lane driving on sharp curve | Stable in gaze | Postpone determination of substituting hands-on signal (request driver to input signal again) |
| Good in weather | Good in sensing time | City street with traffic lights | In-lane driving on sharp curve | Normal in gaze determination | Postpone determination of substituting hands-on signal (request driver to input signal again) |
| Good in weather | Good in sensing time | City street with traffic lights | Braking and acceleration command by driver | Normal in gaze determination | Postpone determination of substituting hands-on signal (request driver to input signal again) |
| Good in weather | Good in sensing time | Urban expressway without traffic lights | Braking and acceleration command by driver | Normal in gaze determination | Postpone determination of substituting hands-on signal (request driver to input signal again) |
| Good in weather | Insufficiency in sensing time | City street with traffic lights | In-lane driving on sharp curve | Normal in gaze determination | Postpone determination of substituting hands-on signal (request driver to input signal again) |
| Good in weather | Insufficiency in sensing time | City street with traffic lights | In-lane driving on sharp curve | Stable in gaze | Postpone determination of substituting hands-on signal (request driver to input signal again) |
| Good in weather | Insufficiency in sensing time | City street with traffic lights | Braking and acceleration command by driver | Normal in gaze determination | Postpone determination of substituting hands-on signal (request driver to input signal again) |
| Good in weather | Insufficiency in sensing time | City street with traffic lights | Braking and acceleration command by driver | Stable in gaze | Postpone determination of substituting hands-on signal (request driver to input signal again) |
| Good in weather | Insufficient in sensing time | Urban expressway without traffic lights | In-lane driving on sharp curve | Stable in gaze | Postpone determination of substituting hands-on signal (request driver to input signal again) |
| Good in weather | Insufficiency in sensing time | Urban expressway without traffic lights | In-lane driving on sharp curve | Normal in gaze determination | Postpone determination of substituting hands-on signal (request driver to input signal again) |

TABLE 4-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Insufficiency in sensing time | Urban expressway without traffic lights | Braking and acceleration command by driver | Normal in gaze determination | Postpone determination of substituting hands-on signal (request driver to input signal again) |
| Good in weather | Insufficiency in sensing zone | Urban expressway without traffic lights | Braking and acceleration command by driver | Stable in gaze | Postpone determination of substituting hands-on signal (request driver to input signal again) |
| Good in weather | Insufficiency in sensing zone | Urban expressway without traffic lights | Situation where lane change is controlled | Stable in gaze | Postpone determination of substituting hands-on signal (request driver to input signal again) |
| Good in weather | Good in sensing zone | Urban expressway without traffic lights | In-lane driving on sharp curve | Normal in gaze determination | Postpone determination of substituting hands-on signal (request driver to input signal again) |
| Good in weather | Good in sensing zone | Urban expressway without traffic lights | In-lane driving on sharp curve | Stable in gaze | Postpone determination of substituting hands-on signal (request driver to input signal again) |
| Good in weather | Good in sensing zone | Urban expressway without traffic lights | Braking and acceleration command by driver | Normal in gaze determination | Postpone determination of Substituting hands-on signal (request driver to input signal again) |

TABLE 5

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Normal in weather | Good in sensing time | City street with traffic lights | In-lane driving on sharp curve | Stable in gaze | Postpone determination of substituting hands-on signal (request driver to input signal again) |
| Normal in weather | Good in sensing time | City street with traffic lights | In-lane driving on sharp curve | Normal in gaze determination | Postpone determination of substituting hands-on signal (request driver to input signal again) |
| Normal in weather | Good in sensing time | City street with traffic lights | Braking and acceleration command by driver | Normal in gaze determination | Postpone determination of substituting hands-on signal (request driver to input signal again) |
| Normal in weather | Good in sensing time | Urban expressway without traffic lights | Braking and acceleration command by driver | Normal in gaze determination | Postpone determination of substituting hands-on signal (request driver to input signal again) |
| Normal in weather | Insufficiency in sensing time | City street with traffic lights | In-lane driving on sharp curve | Normal in gaze determination | Postpone determination of substituting hands-on signal (request driver to input signal again) |
| Normal in weather | Insufficiency in sensing time | City street with traffic lights | In-lane driving on sharp curve | Stable in gaze | Postpone determination of substituting hands-on signal (request driver to input signal again) |

TABLE 5-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Normal in weather | Insufficiency in sensing time | City street with traffic lights | Braking and acceleration command by driver | Normal in gaze determination | Postpone determination of substituting hands-on signal (request driver to input signal again) |
| Normal in weather | Insufficiency in sensing time | City street with traffic lights | Braking and acceleration command by driver | Stable in gaze | Postpone determination of substituting hands-on signal (request driver to input signal again) |
| Normal in weather | Insufficient in sensing time | Urban expressway without traffic lights | In-lane driving on sharp curve | Stable in gaze | Postpone determination of substituting hands-on signal (request driver to input signal again) |
| Normal in weather | Insufficiency in sensing time | Urban expressway without traffic lights | In-lane driving on sharp curve | Normal in gaze determination | Postpone determination of substituting hands-on signal (request driver to input signal again) |
| Normal in weather | Insufficiency in sensing time | Urban expressway without traffic lights | Braking and acceleration command by driver | Normal in gaze determination | Postpone determination of substituting hands-on signal (request driver to input signal again) |
| Normal in weather | Insufficiency in sensing zone | Urban expressway without traffic lights | Braking and acceleration command by driver | Stable in gaze | Postpone determination of substituting hands-on signal (request driver to input signal again) |
| Normal in weather | Insufficiency in sensing zone | Urban expressway without traffic lights | Situation where lane change is controlled | Stable in gaze | Postpone determination of substituting hands-on signal (request driver to input signal again) |
| Normal in weather | Good in sensing zone | Urban expressway without traffic lights | In-lane driving on sharp curve | Normal in gaze determination | Postpone determination of substituting hands-on signal (request driver to input signal again) |
| Normal in weather | Good in sensing zone | Urban expressway without traffic lights | In-lane driving on sharp curve | Stable in gaze | Postpone determination of substituting hands-on signal (request driver to input signal again) |
| Normal in weather | Good in sensing zone | Urban expressway without traffic lights | Braking and acceleration command by driver | Normal in gaze determination | Postpone determination of substituting hands-on signal (request driver to input signal again) |

In Table 4 above, when the weather condition is good in weather, when the condition for the validity of the motion sensing is one of being good in sensing time, being good in sensing zone, or being insufficient in sensing time, when the driving road is an urban expressway without traffic lights or a city street with traffic lights, when the driver state is stable in gaze or is normal in gaze determination, and when the vehicle control state is a braking and acceleration command by the driver or in-lane driving on a sharp curve, the hands-on determination device 100 may postpone determination of substituting a hands-on signal based on motion recognition.

Meanwhile, When the weather condition is good in weather, when the condition for the validity of the motion sensing is insufficient in sensing time, when the driving road is an urban expressway without traffic lights, the driver state is always stable in gaze, and when the vehicle control state is a situation where a lane change is controlled, the hands-on determination device 100 may postpone determination of substituting a hands-on signal based on motion recognition.

Table 5 above is the same as Table 4 above in the other conditions except that the weather condition is normal in weather.

TABLE 6

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Poor in sensing zone | Urban expressway without traffic lights | Situation where lane change is not controlled | Stable in gaze | Postpone determination of substituting hands-on signal (request driver to input signal again) |
| Good in weather | Poor in sensing zone | Urban expressway without traffic lights | Situation where lane change is not controlled | Unstable in gaze | Postpone determination of substituting hands-on signal (request driver to input signal again) |
| Good in weather | Poor in sensing zone | Urban expressway without traffic lights | Situation where lane change is not controlled | Normal in gaze determination | Postpone determination of substituting hands-on signal (request driver to input signal again) |
| Good in weather | Poor in sensing zone | Urban expressway without traffic lights | In-lane driving on gentle curve | Normal in gaze determination | Postpone determination of substituting hands-on signal (request driver to input signal again) |
| Good in weather | Poor in sensing zone | Urban expressway without traffic lights | In-lane driving on gentle curve | Stable in gaze | Postpone determination of substituting hands-on signal (request driver to input signal again) |
| Good in weather | Poor in sensing zone | Urban expressway without traffic lights | In-lane driving on sharp curve | Normal in gaze determination | Postpone determination of substituting hands-on signal (request driver to input signal again) |
| Good in weather | Poor in sensing zone | Urban expressway without traffic lights | In-lane driving on sharp curve | Stable in gaze | Postpone determination of substituting hands-on signal (request driver to input signal again) |
| Good in weather | Poor in sensing zone | City street with traffic lights | Braking and acceleration command by driver | Stable in gaze | Postpone determination of substituting hands-on signal (request driver to input signal again) |
| Good in weather | Poor in sensing zone | City street with traffic lights | Braking and acceleration command by driver | Normal in gaze determination | Postpone determination of substituting hands-on signal (request driver to input signal again) |
| Good in weather | Poor in sensing zone | City street with traffic lights | Situation where lane change is controlled | Normal in gaze determination | Postpone determination of substituting hands-on signal (request driver to input signal again) |
| Good in weather | Poor in sensing zone | City street with traffic lights | Situation where lane change is controlled | Stable in gaze | Postpone determination of substituting hands-on signal (request driver to input signal again) |
| Good in weather | Poor in sensing zone | City street with traffic lights | Situation where lane change is not controlled | Normal in gaze determination | Postpone determination of substituting hands-on signal (request driver to input signal again) |

TABLE 6-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Poor in sensing zone | City street with traffic lights | Situation where lane change is not controlled | Stable in gaze | Postpone determination of substituting hands-on signal (request driver to input signal again) |
| Good in weather | Poor in sensing zone | Urban expressway without traffic lights | Situation where lane change is controlled | Stable in gaze | Postpone determination of substituting hands-on signal (request driver to input signal again) |
| Good in weather | Poor in sensing zone | Urban expressway without traffic lights | Situation where lane change is controlled | Normal in gaze determination | Postpone determination of substituting hands-on signal (request driver to input signal again) |

TABLE 7

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Normal in weather | Poor in sensing zone | Urban expressway without traffic lights | Situation where lane change is not controlled | Stable in gaze | Postpone determination of substituting hands-on signal (request driver to input signal again) |
| Normal in weather | Poor in sensing zone | Urban expressway without traffic lights | Situation where lane change is not controlled | Normal in gaze determination | Postpone determination of substituting hands-on signal (request driver to input signal again) |
| Normal in weather | Poor in sensing zone | Urban expressway without traffic lights | In-lane driving on gentle curve | Normal in gaze determination | Postpone determination of substituting hands-on signal (request driver to input signal again) |
| Normal in weather | Poor in sensing zone | Urban expressway without traffic lights | In-lane driving on gentle curve | Stable in gaze | Postpone determination of substituting hands-on signal (request driver to input signal again) |
| Normal in weather | Poor in sensing zone | Urban expressway without traffic lights | In-lane driving on sharp curve | Normal in gaze determination | Postpone determination of substituting hands-on signal (request driver to input signal again) |
| Normal in weather | Poor in sensing zone | Urban expressway without traffic lights | In-lane driving on sharp curve | Stable in gaze | Postpone determination of substituting hands-on signal (request driver to input signal again) |
| Normal in weather | Poor in sensing zone | City street with traffic lights | Braking and acceleration command by driver | Stable in gaze | Postpone determination of substituting hands-on signal (request driver to input signal again) |
| Normal in weather | Poor in sensing zone | City street with traffic lights | Braking and acceleration command by driver | Normal in gaze determination | Postpone determination of substituting hands-on signal (request driver to input signal again) |

TABLE 7-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Normal in weather | Poor in sensing zone | City street with traffic lights | Situation where lane change is controlled | Normal in gaze determination | Postpone determination of substituting hands-on signal (request driver to input signal again) |
| Normal in weather | Poor in sensing zone | City street with traffic lights | Situation where lane change is controlled | Stable in gaze | Postpone determination of substituting hands-on signal (request driver to input signal again) |
| Normal in weather | Poor in sensing zone | City street with traffic lights | Situation where lane change is not controlled | Normal in gaze determination | Postpone determination of substituting hands-on signal (request driver to input signal again) |
| Normal in weather | Poor in sensing zone | City street with traffic lights | Situation where lane change is not controlled | Stable in gaze | Postpone determination of substituting hands-on signal (request driver to input signal again) |
| Normal in weather | Poor in sensing zone | Urban expressway without traffic lights | Situation where lane change is controlled | Stable in gaze | Postpone determination of substituting hands-on signal (request driver to input signal again) |
| Normal in weather | Poor in sensing zone | Urban expressway without traffic lights | Situation where lane change is controlled | Normal in gaze determination | Postpone determination of substituting hands-on signal (request driver to input signal again) |

In Tables 6 and 7, when the weather condition is good or normal in weather, when the condition for the validity of the motion sensing is poor in sensing zone, when the driving road is an urban expressway without traffic lights or a city street with traffic lights, when the vehicle control state is one of a situation where a lane change is not controlled, in-lane driving on a gentle curve, a situation where a lane change is controlled, a braking and acceleration command by the driver, or in-lane driving on sharp curve, and when the driver state is stable in gaze or is normal in gaze determination, the hands-on determination device 100 may postpone determination of substituting a hands-on signal based on motion recognition.

Furthermore, when the weather condition is good in weather, when the condition for the validity of the motion sensing is poor in sensing zone, when the driving road is an urban expressway without traffic lights, when the vehicle control state is a situation where a lane change is not controlled, and when the driver state is unstable in gaze, the hands-on determination device 100 may postpone determination of substituting a hands-on signal based on motion recognition.

TABLE 8

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Good in sensing time | Special section road | Situation where lane change is not controlled | Stable in gaze | Postpone determination of substituting hands-on signal (request driver to input signal again) |
| Good in weather | Good in sensing time | Special section road | Situation where lane change is not controlled | Normal in gaze determination | Postpone determination of substituting hands-on signal (request driver to input signal again) |
| Good in weather | Good in sensing time | Special section road | In-lane driving on gentle curve | Normal in gaze determination | Postpone determination of substituting hands-on signal (request driver to input signal again) |
| Good in weather | Good in sensing time | Special section road | In-lane driving on gentle curve | Stable in gaze | Postpone determination of substituting hands-on signal (request driver to input signal again) |

TABLE 8-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Good in sensing time | Special section road | In-lane driving on sharp curve | Normal in gaze determination | Postpone determination of substituting hands-on signal (request driver to input signal again) |
| Good in weather | Good in sensing time | Special section road | In-lane driving on sharp curve | Stable in gaze | Postpone determination of substituting hands-on signal (request driver to input signal again) |
| Good in weather | Good in sensing zone | Special section road | Braking and acceleration command by driver | Stable in gaze | Postpone determinatigon of substituting hands-on signal (request driver to input signal again) |
| Good in weather | Good in sensing zone | Special section road | Braking and acceleration command by driver | Normal in gaze determination | Postpone determination of substituting hands-on signal (request driver to input signal again) |
| Good in weather | Good in sensing zone | Special section road | Situation where lane change is controlled | Normal in gaze determination | Postpone determination of substituting hands-on signal (request driver to input signal again) |
| Good in weather | Good in sensing zone | Special section road | Situation where lane change is controlled | Stable in gaze | Postpone determination of substituting hands-on signal (request driver to input signal again) |
| Good in weather | Good in sensing zone | Special section road | Situation where lane change is not controlled | Normal in gaze determination | Postpone determination of substituting hands-on signal (request driver to input signal again) |
| Good in weather | Good in sensing zone | Special section road | Situation where lane change is not controlled | Stable in gaze | Postpone determination of substituting hands-on signal (request driver to input signal again) |
| Good in weather | Good in sensing zone | Special section road | In-lane driving on sharp curve | Stable in gaze | Postpone determination of substituting hands-on signal (request driver to input signal again) |
| Good in weather | Good in sensing zone | Special section road | In-lane driving on sharp curve | Normal in gaze determination | Postpone determination of substituting hands-on signal (request driver to input signal again) |

TABLE 9

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Normal in weather | Good in sensing time | Special section road | Situation where lane change is not controlled | Stable in gaze | Postpone determination of substituting hands-on signal (request driver to input signal again) |

TABLE 9-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Normal in weather | Good in sensing time | Special section road | Situation where lane change is not controlled | Normal in gaze determination | Postpone determination of substituting hands-on signal (request driver to input signal again) |
| Normal in weather | Good in sensing time | Special section road | In-lane driving on gentle curve | Normal in gaze determination | Postpone determination of substituting hands-on signal (request driver to input signal again) |
| Normal in weather | Good in sensing time | Special section road | In-lane driving on gentle curve | Stable in gaze | Postpone determination of substituting hands-on signal (request driver to input signal again) |
| Normal in weather | Good in sensing time | Special section road | In-lane driving on sharp curve | Normal in gaze determination | Postpone determination of substituting hands-on signal (request driver to input signal again) |
| Normal in weather | Good in sensing time | Special section road | In-lane driving on sharp curve | Stable in gaze | Postpone determination of substituting hands-on signal (request driver to input signal again) |
| Normal in weather | Good in sensing zone | Special section road | Braking and acceleration command by driver | Stable in gaze | Postpone determination of substituting hands-on signal (request driver to input signal again) |
| Normal in weather | Good in sensing zone | Special section road | Braking and acceleration command by driver | Normal in gaze determination | Postpone determination of substituting hands-on signal (request driver to input signal again) |
| Normal in weather | Good in sensing zone | Special section road | Situation where lane change is controlled | Normal in gaze determination | Postpone determination of substituting hands-on signal (request driver to input signal again) |
| Normal in weather | Good in sensing zone | Special section road | Situation where lane change is controlled | Stable in gaze | Postpone determination of substituting hands-on signal (request driver to input signal again) |
| Normal in weather | Good in sensing zone | Special section road | Situation where lane change is not controlled | Normal in gaze determination | Postpone determination of substituting hands-on signal (request driver to input signal again) |
| Normal in weather | Good in sensing zone | Special section road | Situation where lane change is not controlled | Stable in gaze | Postpone determination of substituting hands-on signal (request driver to input signal again) |
| Normal in weather | Good in sensing zone | Special section road | In-lane driving on sharp curve | Stable in gaze | Postpone determination of substituting hands-on signal (request driver to input signal again) |

TABLE 9-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Normal in weather | Good in sensing zone | Special section road | In-lane driving on sharp curve | Normal in gaze determination | Postpone determination of substituting hands-on signal (request driver to input signal again) |

In Tables 8 and 9, when the weather condition is good or normal in weather, when the condition for the validity of the motion sensing is good in sensing time and is good in sensing zone, when the driving road is a special section road, when the vehicle control state is one of a situation where a lane change is not controlled, in-lane driving on a gentle curve, or a situation where a lane change is controlled, a braking and acceleration command by the driver, or in-lane driving on a sharp curve, and when the driver state is stable in gaze or is normal in gaze determination, the hands-on determination device 100 may postpone determination of substituting a hands-on signal based on motion recognition.

Hereinafter, Tables 10 to 15 indicate that it is impossible to determine to substitute a hands-on signal.

TABLE 10

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Poor in weather | Good in sensing time | Urban expressway without traffic lights | Situation where lane change is controlled | Unstable in gaze | It is impossible to determine to substitute hands-on signal (notify driver of impossible situation) |
| Poor in weather | Good in sensing time | Urban expressway without traffic lights | Situation where lane change is not controlled | Unstable in gaze | It is impossible to determine to substitute hands-on signal (notify driver of impossible situation) |
| Poor in weather | Good in sensing time | Urban expressway without traffic lights | In-lane driving on gentle curve | Unstable in gaze | It is impossible to determine to substitute hands-on signal (notify driver of impossible situation) |
| Poor in weather | Good in sensing time | City street with traffic lights | In-lane driving on sharp curve | Unstable in gaze | It is impossible to determine to substitute hands-on signal (notify driver of impossible situation) |
| Poor in weather | Good in sensing time | City street with traffic lights | Braking and acceleration command by driver | Unstable in gaze | It is impossible to determine to substitute hands-on signal (notify driver of impossible situation) |
| Poor in weather | Good in sensing time | City street with traffic lights | Situation where lane change is controlled | Unstable in gaze | It is impossible to determine to substitute hands-on signal (notify driver of impossible situation) |
| Poor in weather | Good in sensing zone | Special section road | Situation where lane change is not controlled | Unstable in gaze | It is impossible to determine to substitute hands-on signal (notify driver of impossible situation) |
| Poor in weather | Good in sensing zone | Special section road | In-lane driving on gentle curve | Unstable in gaze | It is impossible to determine to substitute hands-on signal (notify driver of impossible situation) |

TABLE 10-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Poor in weather | Good in sensing zone | Special section road | In-lane driving on sharp curve | Unstable in gaze | It is impossible to determine to substitute hands-on signal (notify driver of impossible situation) |
| Poor in weather | Good in sensing zone | Urban expressway without traffic lights | Braking and acceleration on command by driver | Unstable in gaze | It is impossible to determine to substitute hands-on signal (notify driver of impossible situation) |
| Poor in weather | Insufficient in sensing time | City street with traffic lights | In-lane driving on gentle curve | Unstable in gaze | It is impossible to determine to substitute hands-on signal (notify driver of impossible situation) |
| Poor in weather | Insufficient in sensing time | City street with traffic lights | In-lane driving on sharp curve | Unstable in gaze | It is impossible to determine to substitute hands-on signal (notify driver of impossible situation) |
| Poor in weather | Insufficient in sensing time | City street with traffic lights | Braking and acceleration command by driver | Unstable in gaze | It is impossible to determine to substitute hands-on signal (notify driver of impossible situation) |
| Poor in weather | Insufficient in sensing time | Special section road | Situation where lane change is controlled | Unstable in gaze | It is impossible to determine to substitute hands-on signal (notify driver of impossible situation) |
| Poor in weather | Insufficient in sensing time | Special section road | Situation where lane change is not controlled | Unstable in gaze | It is impossible to determine to substitute hands-on signal (notify driver of impossible situation) |
| Poor in weather | Insufficient in sensing time | Special section road | In-lane driving on gentle curve | Unstable in gaze | It is impossible to determine to substitute hands-on signal (notify driver of impossible situation) |
| Poor in weather | Insufficient in sensing time | Urban expressway without traffic lights | In-lane driving on sharp curve | Unstable in gaze | It is impossible to determine to substitute hands-on signal (notify driver of impossible situation) |
| Poor in weather | Insufficient in sensing time | Urban expressway without traffic lights | Braking and acceleration command by driver | Unstable in gaze | It is impossible to determine to substitute hands-on signal (notify driver of impossible situation) |
| Poor in weather | Insufficient in sensing time | Urban expressway without traffic lights | Situation where lane change is controlled | Unstable in gaze | It is impossible to determine to substitute hands-on signal (notify driver of impossible situation) |
| Poor in weather | Insufficient in sensing time | City street with traffic lights | Situation where lane change is not controlled | Unstable in gaze | It is impossible to determine to substitute hands-on signal (notify driver of impossible situation) |

TABLE 11

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Poor in weather | Good in sensing zone | Special section road | Braking and acceleration on command by driver | Unstable in gaze | It is impossible to determine to substitute hands-on signal (notify driver of impossible situation) |
| Poor in weather | Good in sensing zone | Special section road | Situation where lane change is controlled | Unstable in gaze | It is impossible to determine to substitute hands-on signal (notify driver of impossible situation) |
| Poor in weather | Good in sensing zone | Special section road | Situation where lane change is not controlled | Unstable in gaze | It is impossible to determine to substitute hands-on signal (notify driver of impossible situation) |
| Poor in weather | Good in sensing zone | Urban expressway without traffic lights | In-lane driving on gentle curve | Unstable in gaze | It is impossible to determine to substitute hands-on signal (notify driver of impossible situation) |
| Poor in weather | Good in sensing zone | Urban expressway without traffic lights | In-lane driving on sharp curve | Unstable in gaze | It is impossible to determine to substitute hands-on signal (notify driver of impossible situation) |
| Poor in weather | Good in sensing zone | Urban expressway without traffic lights | Braking and acceleration command by driver | Unstable in gaze | It is impossible to determine to substitute hands-on signal (notify driver of impossible situation) |
| Poor in weather | Good in sensing zone | City street with traffic lights | Situation where lane change is controlled | Unstable in gaze | It is impossible to determine to substitute hands-on signal (notify driver of impossible situation) |
| Poor in weather | Good in sensing zone | City street with traffic lights | Situation where lane change is not controlled | Unstable in gaze | It is impossible to determine to substitute hands-on signal (notify driver of impossible situation) |
| Poor in weather | Good in sensing zone | City street with traffic lights | In-lane driving on gentle curve | Unstable in gaze | It is impossible to determine to substitute hands-on signal (notify driver of impossible situation) |
| Poor in weather | Good in sensing zone | Special section road | In-lane driving on sharp curve | Unstable in gaze | It is impossible to determine to substitute hands-on signal (notify driver of impossible situation) |
| Poor in weather | poor in sensing zone | Urban expressway without traffic lights | Situation where lane change is not controlled | Unstable in gaze | It is impossible to determine to substitute hands-on signal (notify driver of impossible situation) |
| Poor in weather | Poor in sensing zone | Urban expressway without traffic lights | In-lane driving on gentle curve | Unstable in gaze | It is impossible to determine to substitute hands-on signal (notify driver of impossible situation) |

TABLE 11-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Poor in weather | Poor in sensing zone | Urban expressway without traffic lights | In-lane driving on sharp curve | Unstable in gaze | It is impossible to determine to substitute hands-on signal (notify driver of impossible situation) |
| Poor in weather | Poor in sensing zone | City street with traffic lights | Braking and acceleration command by driver | Unstable in gaze | It is impossible to determine to substitute hands-on signal (notify driver of impossible situation) |
| Poor in weather | Poor in sensing zone | City street with traffic lights | Situation where lane change is controlled | Unstable in gaze | It is impossible to determine to substitute hands-on signal (notify driver of impossible situation) |
| Poor in weather | Poor in sensing zone | City street with traffic lights | Situation where lane change is not controlled | Unstable in gaze | It is impossible to determine to substitute hands-on signal (notify driver of impossible situation) |
| Poor in weather | Poor in sensing zone | Special section road | In-lane driving on gentle curve | Unstable in gaze | It is impossible to determine to substitute hands-on signal (notify driver of impossible situation) |

In Tables 10 and 11, when the weather condition is poor, irrespective of the other conditions, the hands-on determination device 100 may determine that it is impossible to determine to substitute a hands-on signal based on motion recognition and may notify the driver of the determined result.

TABLE 12

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Good in sensing time | Urban expressway without traffic lights | Situation where lane change is controlled | Unstable in gaze | It is impossible to determine to substitute hands-on signal (notify driver of impossible situation) |
| Good in weather | Good in sensing time | Urban expressway without traffic lights | Situation where lane change is not controlled | Unstable in gaze | It is impossible to determine to substitute hands-on signal (notify driver of impossible situation) |
| Good in weather | Good in sensing time | Urban expressway without traffic lights | In-lane driving on gentle curve | Unstable in gaze | It is impossible to determine to substitute hands-on signal (notify driver of impossible situation) |
| Good in weather | Good in sensing time | City street with traffic lights | In-lane driving on sharp curve | Unstable in gaze | It is impossible to determine to substitute hands-on signal (notify driver of impossible situation) |
| Good in weather | Good in sensing time | City street with traffic lights | Braking and acceleration command by driver | Unstable in gaze | It is impossible to determine to substitute hands-on signal (notify driver of impossible situation) |
| Good in weather | Good in sensing time | City street with traffic lights | Situation where lane change is controlled | Unstable in gaze | It is impossible to determine to substitute hands-on signal (notify driver of impossible situation) |

TABLE 12-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Good in sensing zone | Special section road | Situation where lane change is not controlled | Unstable in gaze | It is impossible to determine to substitute hands-on signal (notify driver of impossible situation) |
| Good in weather | Good in sensing zone | Special section road | In-lane driving on gentle curve | Unstable in gaze | It is impossible to determine to substitute hands-on signal (notify driver of impossible situation) |
| Good in weather | Good in sensing zone | Special section road | In-lane driving on sharp curve | Unstable in gaze | It is impossible to determine to substitute hands-on signal (notify driver of impossible situation) |
| Good in weather | Good in sensing zone | Urban expressway without traffic lights | Braking and acceleration command by driver | Unstable in gaze | It is impossible to determine to substitute hands-on signal (notify driver of impossible situation) |
| Good in weather | Insufficient in sensing time | City street with traffic lights | In-lane driving on gentle curve | Unstable in gaze | It is impossible to determine to substitute hands-on signal (notify driver of impossible situation) |
| Good in weather | Insufficient in sensing time | City street with traffic lights | In-lane driving on sharp curve | Unstable in gaze | It is impossible to determine to substitute hands-on signal (notify driver of impossible situation) |
| Good in weather | Insufficient in sensing time | City street with traffic lights | Braking and acceleration command by driver | Unstable in gaze | It is impossible to determine to substitute hands-on signal (notify driver of impossible situation) |
| Good in weather | Insufficient in sensing time | Special section road | Situation where lane change is controlled | Unstable in gaze | It is impossible to determine to substitute hands-on signal (notify driver of impossible situation) |
| Good in weather | Insufficient in sensing time | Special section road | Situation where lane change is not controlled | Unstable in gaze | It is impossible to determine to substitute hands-on signal (notify driver of impossible situation) |
| Good in weather | Insufficient in sensing time | Special section road | In-lane driving on gentle curve | Unstable in gaze | It is impossible to determine to substitute hands-on signal (notify driver of impossible situation) |
| Good in weather | Insufficient in sensing time | Urban expressway without traffic lights | In-lane driving on sharp curve | Unstable in gaze | It is impossible to determine to substitute hands-on signal (notify driver of impossible situation) |
| Good in weather | Insufficient in sensing time | Urban expressway without traffic lights | Braking and acceleration command by driver | Unstable in gaze | It is impossible to determine to substitute hands-on signal (notify driver of impossible situation) |

TABLE 12-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Insufficient in sensing time | Urban expressway without traffic lights | Situation where lane change is controlled | Unstable in gaze | It is impossible to determine to substitute hands-on signal (notify driver of impossible situation) |
| Good in weather | Insufficient in sensing time | City street with traffic lights | Situation where lane change is not controlled | Unstable in gaze | It is impossible to determine to substitute hands-on signal (notify driver of impossible situation) |

TABLE 13

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Good in sensing zone | Special section road | Braking and acceleration command by driver | Unstable in gaze | It is impossible to determine to substitute hands-on signal (notify driver of impossible situation) |
| Good in weather | Good in sensing zone | Special section road | Situation where lane change is controlled | Unstable in gaze | It is impossible to determine to substitute hands-on signal (notify driver of impossible situation) |
| Good in weather | Good in sensing zone | Special section road | Situation where lane change is not controlled | Unstable in gaze | It is impossible to determine to substitute hands-on signal (notify driver of impossible situation) |
| Good in weather | Good in sensing zone | Urban expressway without traffic lights | In-lane driving on gentle curve | Unstable in gaze | It is impossible to determine to substitute hands-on signal (notify driver of impossible situation) |
| Good in weather | Good in sensing zone | Urban expressway without traffic lights | In-lane driving on sharp curve | Unstable in gaze | It is impossible to determine to substitute hands-on signal (notify driver of impossible situation) |
| Good in weather | Good in sensing zone | Urban expressway without traffic lights | Braking and acceleration command by driver | Unstable in gaze | It is impossible to determine to substitute hands-on signal (notify driver of impossible situation) |
| Good in weather | Good in sensing zone | City street with traffic lights | Situation where lane change is controlled | Unstable in gaze | It is impossible to determine to substitute hands-on signal (notify driver of impossible situation) |
| Good in weather | Good in sensing zone | City street with traffic lights | Situation where lane change is not controlled | Unstable in gaze | It is impossible to determine to substitute hands-on signal (notify driver of impossible situation) |
| Good in weather | Good in sensing zone | City street with traffic lights | In-lane driving on gentle curve | Unstable in gaze | It is impossible to determine to substitute hands-on signal (notify driver of impossible situation) |

TABLE 13-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Good in sensing zone | Special section road | In-lane driving on sharp curve | Unstable in gaze | It is impossible to determine to substitute hands-on signal (notify driver of impossible situation) |
| Good in weather | poor in sensing zone | Urban expressway without traffic lights | Situation where lane change is not controlled | Unstable in gaze | It is impossible to determine to substitute hands-on signal (notify driver of impossible situation) |
| Good in weather | Poor in sensing zone | Urban expressway without traffic lights | In-lane driving on gentle curve | Unstable in gaze | It is impossible to determine to substitute hands-on signal (notify driver of impossible situation) |
| Good in weather | Poor in sensing zone | Urban expressway without traffic lights | In-lane driving on sharp curve | Unstable in gaze | It is impossible to determine to substitute hands-on signal (notify driver of impossible situation) |
| Good in weather | Poor in sensing zone | City street with traffic lights | Braking and acceleration command by driver | Unstable in gaze | It is impossible to determine to substitute hands-on signal (notify driver of impossible situation) |
| Good in weather | Poor in sensing zone | City street with traffic lights | Situation where lane change is controlled | Unstable in gaze | It is impossible to determine to substitute hands-on signal (notify driver of impossible situation) |
| Good in weather | Poor in sensing zone | City street with traffic lights | Situation where lane change is not controlled | Unstable in gaze | It is impossible to determine to substitute hands-on signal (notify driver of impossible situation) |
| Good in weather | Poor in sensing zone | Special section road | In-lane driving on gentle curve | Unstable in gaze | It is impossible to determine to substitute hands-on signal (notify driver of impossible situation) |

In Tables 12 and 13, when the driver state is unstable in gaze, irrespective of the other conditions, the hands-on determination device 100 may determine that it is impossible to determine to substitute a hands-on signal based on motion recognition. Herein, exceptionally, although the driver state is unstable in gaze, when the weather is good, when the sensing zone is poor, when there is an urban expressway without traffic lights, and when a lane change is not controlled, the hands-on determination device 100 may postpone determination of substituting a hands-on signal based on motion recognition.

TABLE 14

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Insufficient in sensing time | Special section road | Situation where lane change is controlled | stable in gaze | It is impossible to determine to substitute hands-on signal (notify driver of impossible situation) |
| Good in weather | Insufficient in sensing time | Special section road | Situation where lane change is controlled | Normal in gaze determination | It is impossible to determine to substitute hands-on signal (notify driver of impossible situation) |

TABLE 14-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Good in weather | Insufficient in sensing time | Special section road | Situation where lane change is not controlled | Normal in gaze determination | It is impossible to determine to substitute hands-on signal (notify driver of impossible situation) |
| Good in weather | Insufficient in sensing time | Special section road | Situation where lane change is not controlled | stable in gaze | It is impossible to determine to substitute hands-on signal (notify driver of impossible situation) |
| Good in weather | Insufficient in sensing time | Special section road | In-lane driving on gentle curve | Normal in gaze determination | It is impossible to determine to substitute hands-on signal (notify driver of impossible situation) |
| Good in weather | Insufficient in sensing time | Special section road | In-lane driving on gentle curve | stable in gaze | It is impossible to determine to substitute hands-on signal (notify driver of impossible situation) |
| Good in weather | Poor in sensing zone | Special section road | In-lane driving on gentle curve | stable in gaze | It is impossible to determine to substitute hands-on signal (notify driver of impossible situation) |
| Good in weather | Poor in sensing zone | Special section road | In-lane driving on gentle curve | Normal in gaze determination | It is impossible to determine to substitute hands-on signal (notify driver of impossible situation) |
| Good in weather | Poor in sensing zone | Special section road | In-lane driving on sharp curve | Normal in gaze determination | It is impossible to determine to substitute hands-on signal (notify driver of impossible situation) |
| Good in weather | Poor in sensing zone | Special section road | In-lane driving on sharp curve | stable in gaze | It is impossible to determine to substitute hands-on signal (notify driver of impossible situation) |
| Good in weather | poor in sensing zone | Special section road | Braking and acceleration command by driver | Normal in gaze determination | It is impossible to determine to substitute hands-on signal (notify driver of impossible situation) |
| Good in weather | Poor in sensing zone | Special section road | Braking and acceleration command by driver | Stable in gaze | It is impossible to determine to substitute hands-on signal (notify driver of impossible situation) |

TABLE 15

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Normal in weather | Insufficient in sensing time | Special section road | Situation where lane change is controlled | stable in gaze | It is impossible to determine to substitute hands-on signal (notify driver of impossible situation) |

TABLE 15-continued

| Weather STEP1 | Validity of motion sensing STEP2 | Classification of driving road STEP3 | Vehicle control state STEP4 | Driver state STEP5 | Motion recognition Strategy response |
|---|---|---|---|---|---|
| Normal in weather | Insufficient in sensing time | Special section road | Situation where lane change is controlled | Normal in gaze determination | It is impossible to determine to substitute hands-on signal (notify driver of impossible situation) |
| Normal in weather | Insufficient in sensing time | Special section road | Situation where lane change is not controlled | Normal in gaze determination | It is impossible to determine to substitute hands-on signal (notify driver of impossible situation) |
| Normal in weather | Insufficient in sensing time | Special section road | Situation where lane change is not controlled | stable in gaze | It is impossible to determine to substitute hands-on signal (notify driver of impossible situation) |
| Normal in weather | Insufficient in sensing time | Special section road | In-lane driving on gentle curve | Normal in gaze determination | It is impossible to determine to substitute hands-on signal (notify driver of impossible situation) |
| Normal in weather | Insufficient in sensing time | Special section road | In-lane driving on gentle curve | stable in gaze | It is impossible to determine to substitute hands-on signal (notify driver of impossible situation) |
| Normal in weather | Poor in sensing zone | Special section road | In-lane driving on gentle curve | stable in gaze | It is impossible to determine to substitute hands-on signal (notify driver of impossible situation) |
| Normal in weather | Poor in sensing zone | Special section road | In-lane driving on gentle curve | Normal in gaze determination | It is impossible to determine to substitute hands-on signal (notify driver of impossible situation) |
| Normal in weather | Poor in sensing zone | Special section road | In-lane driving on sharp curve | Normal in gaze determination | It is impossible to determine to substitute hands-on signal (notify driver of impossible situation) |
| Normal in weather | Poor in sensing zone | Special section road | In-lane driving on sharp curve | stable in gaze | It is impossible to determine to substitute hands-on signal (notify driver of impossible situation) |
| Normal in weather | poor in sensing zone | Special section road | Braking and acceleration command by driver | Normal in gaze determination | It is impossible to determine to substitute hands-on signal (notify driver of impossible situation) |
| Normal in weather | Poor in sensing zone | Special section road | Braking and acceleration command by driver | Stable in gaze | It is impossible to determine to substitute hands-on signal (notify driver of impossible situation) |

In Tables 14 and 15, when the weather condition is good or normal in weather, when the condition for the validity of the motion sensing is insufficient in sensing time and is poor in sensing zone, when the driving road is a special section road, when the vehicle control state is one of a situation where a lane change is not controlled, in-lane driving on a gentle curve, a situation where a lane change is controlled, a braking and acceleration command by the driver, or in-lane driving on a sharp curve, and when the driver state is stable in gaze or is normal in gaze determination, the hands-on determination device 100 may determine that it is impossible to determine to substitute a hands-on signal based on motion recognition.

Furthermore, in a state where the condition for the validity of the motion sensing is poor in sensing zone, in case of at least one or more of when the weather condition is poor in weather, when the driving road is a special section road, when the vehicle control state is a braking and acceleration command by the driver or in-lane driving on a sharp curve, or when the driver state is unstable in gaze, the hands-on determination device 100 may determine that it is impossible to determine to substitute a hands-on signal based on motion recognition.

Figure 6:
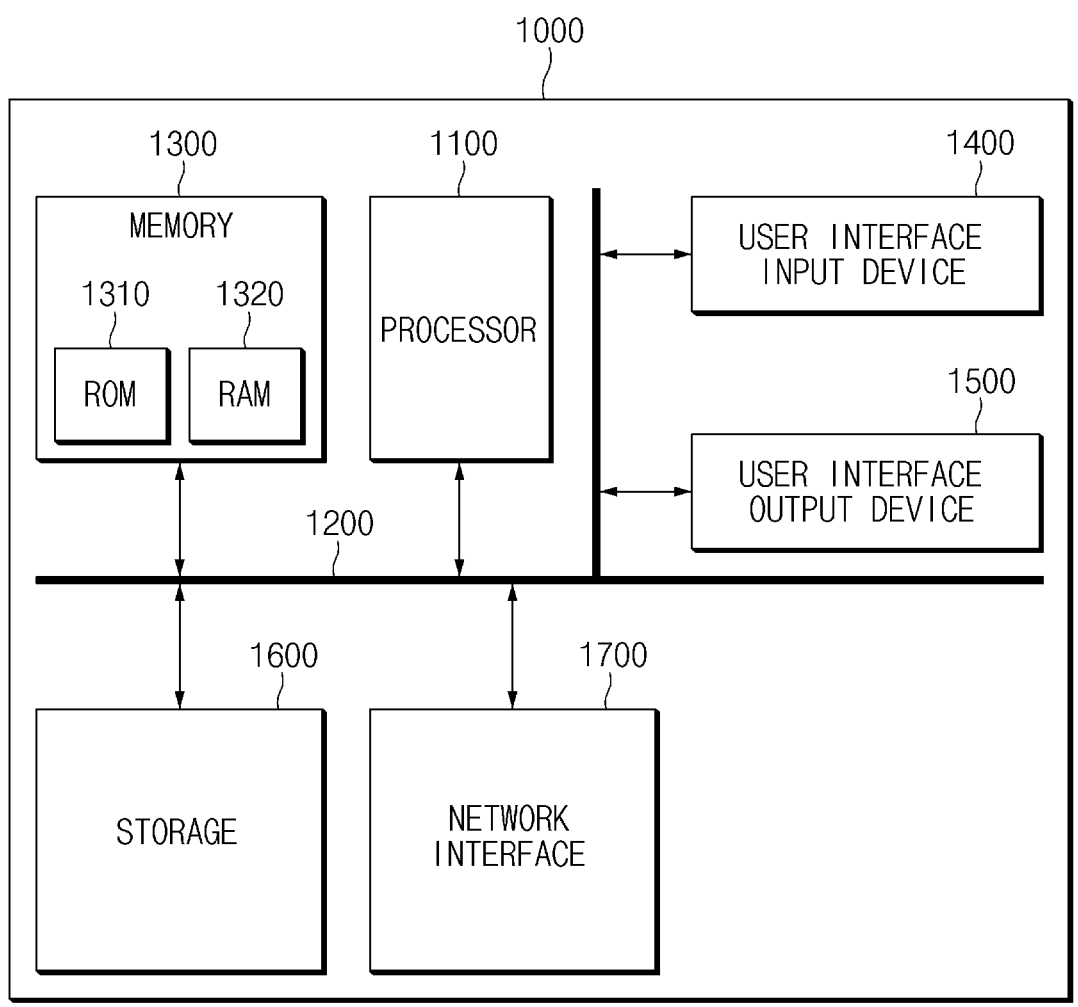
FIG. 6 is a block diagram illustrating a computing system in one form of the present disclosure.

FIG. 6 is a block diagram illustrating a computing system in some forms of the present disclosure.

Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may determine that the driver puts his or her hands on the steering wheel although the driver is slightly away from the steering wheel without holding the steering wheel of the vehicle, thus minimizing a time delay taken from a hands-off state of the steering wheel to a hands-on state of the steering wheel.

The present technology may determine suitability of a motion recognition situation based on weather, a motion recognition level, driving road classification, a vehicle control state, and a driver state upon hands-on determination.

In addition, various effects directly or indirectly ascertained through the present disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A hands-on determination device, comprising:
a processor configured to:
    determine a hands-on state of a driver through a motion recognition;
    determine suitability of a result of the determination of the hands-on state through the motion recognition based on at least one of a weather condition, a condition for validity of motion sensing, classification of a driving road, or a vehicle control state;
    determine whether to use the result of determination of the hands-on state through the motion recognition rather than a result of determining the hands-on by a sensor;
    control a vehicle based on a result of the determination of whether to use the result of determination of the hands-on state through the motion recognition rather than the result of determining the hands-on by the sensor; and
a storage configured to store data for the motion recognition.

2. The hands-on determination device of claim 1, wherein the processor is further configured to:
    classify the weather condition as good in weather, normal in weather, or poor in weather;
    classify the validity of the motion sensing as good in sensing time, insufficient in sensing time, good in sensing zone, or poor in sensing zone;
    classify the classification of the driving road as an urban expressway without traffic lights, a city street with traffic lights, or a special section road;
    classify the vehicle control state as a situation where a lane change is not controlled, in-lane driving on a gentle curve, a situation where a lane change is controlled, a braking and acceleration command by the driver, or in-lane driving on a sharp curve; and
    classify a driver state as stable in gaze, unstable in gaze, or normal in gaze determination.

3. The hands-on determination device of claim 1, wherein the processor is further configured to apply the result of the determination of the hands-on state to vehicle control when:
    the weather condition is good or poor in weather,
    the condition for the validity of the motion sensing is one of being good in sensing time, being good in sensing zone, or being insufficient in sensing time,
    the driving road is an urban expressway without traffic lights or a city street with traffic lights,
    the vehicle control state is a situation where a lane change is not controlled or in-lane driving on a gentle curve, and
    a driver state is always stable in gaze.

4. The hands-on determination device of claim 1, wherein the processor is further configured to apply the result of the determination of the hands-on state to vehicle control after a predetermined amount of monitoring time when:
    the weather condition is good or normal in weather,
    the condition for the validity of the motion sensing is one of being good in sensing time, being good in sensing zone, or being insufficient in sensing time,
    the driving road is an urban expressway without traffic lights or a city street with traffic lights, and
    the vehicle control state is a braking and acceleration command by the driver or a situation where a lane change is controlled in a state where a driver state is stable in gaze.

5. The hands-on determination device of claim 1, wherein the processor is further configured to apply the result of the determination of the hands-on state to vehicle control after a predetermined amount of monitoring time when:
- the condition for the validity of the motion sensing is one of being good in sensing time, being good in sensing zone, or being insufficient in sensing time,
- the driving road is an urban expressway without traffic lights or a city street with traffic lights,
- the vehicle control state is one of a situation where a lane change is not controlled, in-lane driving on a gentle curve, or a situation where a lane change is controlled, and
- a driver state is normal in gaze determination.

6. The hands-on determination device of claim 1, wherein the processor is further configured to determine a hands-on signal based on the motion recognition after a predetermined time period when:
- the weather condition is good or normal in weather,
- the condition for the validity of the motion sensing is one of being good in sensing time, being good in sensing zone, or being insufficient in sensing time,
- the driving road is an urban expressway without traffic lights or a city street with traffic lights,
- a driver state is stable in gaze or is normal in gaze determination, and
- the vehicle control state is a braking and acceleration command by the driver or in-lane driving on a sharp curve.

7. The hands-on determination device of claim 1, wherein the processor is further configured to determine a hands-on signal based on the motion recognition after a predetermined time period when:
- the weather condition is good or normal in weather,
- the condition for the validity of the motion sensing is insufficient in sensing time,
- the driving road is an urban expressway without traffic lights, a driver state is always stable in gaze, and
- the vehicle control state is a situation where a lane change is controlled.

8. The hands-on determination device of claim 1, wherein the processor is further configured to determine a hands-on signal based on the motion recognition after a predetermined time period when:
- the weather condition is good or normal in weather,
- the condition for the validity of the motion sensing is poor in sensing zone,
- the driving road is an urban expressway without traffic lights or a city street with traffic lights,
- the vehicle control state is one of a situation where a lane change is not controlled, in-lane driving on a gentle curve, a situation where a lane change is controlled, a braking and acceleration command by the driver, or in-lane driving on sharp curve, and
- a driver state is stable in gaze or is normal in gaze determination.

9. The hands-on determination device of claim 1, wherein the processor is further configured to determine a hands-on signal based on the motion recognition after a predetermined time period when:
- the weather condition is good in weather,
- the condition for the validity of the motion sensing is poor in sensing zone, the driving road is an urban expressway without traffic lights,
- the vehicle control state is a situation where a lane change is not controlled, and
- a driver state is unstable in gaze.

10. The hands-on determination device of claim 1, wherein the processor is further configured to determine a hands-on signal based on the motion recognition after a predetermined time period when:
- the weather condition is good or normal in weather,
- the condition for the validity of the motion sensing is good in sensing time and is good in sensing zone,
- the driving road is a special section road,
- the vehicle control state is one of a situation where a lane change is not controlled, in-lane driving on a gentle curve, a situation where a lane change is controlled, a braking and acceleration command by the driver, or in-lane driving on a sharp curve, and
- a driver state is stable in gaze or is normal in gaze determination.

11. The hands-on determination device of claim 1, wherein the processor is further configured to:
- when the weather condition is poor in weather, determine that it is impossible to determine a hands-on signal based on the motion recognition and notify the driver of a result of the determination of the impossibility, irrespective of other conditions.

12. The hands-on determination device of claim 1, wherein the processor is further configured to:
- when a driver state is unstable in gaze, determine that it is impossible to determine whether to use a hands-on signal based on the motion recognition, irrespective of other conditions; and
- determining whether to use the hands-on signal based on the motion recognition after a predetermined time although the driver state is unstable in gaze, when:
  - a weather is good,
  - a sensing zone is poor,
  - there is an urban expressway without traffic lights, and
  - a lane change is not controlled.

13. The hands-on determination device of claim 1, wherein the processor is further configured to determine that it is impossible to determine a hands-on signal based on the motion recognition when:
- the weather condition is good or normal in weather,
- the condition for the validity of the motion sensing is insufficient in sensing time and is poor in sensing zone,
- the driving road is a special section road,
- the vehicle control state is one of a situation where a lane change is not controlled, in-lane driving on a gentle curve, a situation where a lane change is controlled, a braking and acceleration command by the driver, or in-lane driving on a sharp curve, and
- a driver state is stable in gaze or is normal in gaze determination.

14. The hands-on determination device of claim 1, wherein the processor is further configured to determine that it is impossible to determine a hands-on signal based on the motion recognition when:
- the weather condition is poor in weather,
- the driving road is a special section road,
- the vehicle control state is a braking and acceleration command by the driver or in-lane driving on a sharp curve, or
- a driver state is unstable in gaze where the condition for the validity of the motion sensing is poor in sensing zone.

15. The hands-on determination device of claim 1, wherein the processor is further configured to:
- determine a current state as the hands-on state when hands of the driver are located within a predetermined range without holding a steering wheel of the vehicle.

16. A vehicle system, comprising:
a hands-on determination device configured to:
- determine a hands-on state of a driver through a motion recognition;
- determine suitability of a result of the determination of the hands-on state through the motion recognition based on at least one of a weather condition, a condition for validity of motion sensing, classification of a driving road, or a vehicle control state; and
- determine whether to use the result of determination of the hands-on state through the motion recognition rather than a result of determining the hands-on by a sensor; and a vehicle controller configured to control the vehicle based on a result of the determination of whether to use the result of determination of the hands-on state through the motion recognition rather than the result of determining the hands-on by the sensor.

17. A vehicle control method, comprising:
determining a hands-on state of a driver through a motion recognition;
determining suitability of a result of the determination of the hands-on state through the motion recognition based on at least one of a weather condition, a condition for validity of motion sensing, classification of a driving road, or a vehicle control state;
determining whether to use the result of determination of the hands-on state through the motion recognition rather than a result of determining the hands-on by a sensor; and
controlling a vehicle based on a result of the determination of whether to use the result of determination of the hands-on state through the motion recognition rather than the result of determining the hands-on by the sensor.

18. The vehicle control method of claim 17, wherein the controlling of the vehicle includes:
applying the result of the determination of the hands-on state based on the motion recognition immediately to vehicle control when:
- the weather condition is good or poor in weather,
- the condition for the validity of the motion sensing is one of being good in sensing time, being good in sensing zone, or being insufficient in sensing time,
- the driving road is an urban expressway without traffic lights or a city street with traffic lights,
- the vehicle control state is a situation where a lane change is not controlled or in-lane driving on a gentle curve, and
- a driver state is always stable in gaze.

19. The vehicle control method of claim 17, wherein the controlling of the vehicle includes:
applying the result of the determination of the hands-on state based on the motion recognition to vehicle control after a predetermined amount of monitoring time when:
- the weather condition is good or normal in weather,
- the condition for the validity of the motion sensing is one of being good in sensing time, being good in sensing zone, or being insufficient in sensing time,
- the driving road is an urban expressway without traffic lights or a city street with traffic lights, and
- the vehicle control state is a braking and acceleration command by the driver or a situation where a lane change is controlled in a state where a driver state is stable in gaze.

20. The vehicle control method of claim 17, wherein the determining of the hands-on state includes:
determining a current state as the hands-on state when hands of the driver are located within a predetermined range without holding a steering wheel of the vehicle.

* * * * *